(12) United States Patent
Wood et al.

(10) Patent No.: US 7,818,164 B2
(45) Date of Patent: Oct. 19, 2010

(54) METHOD AND SYSTEM FOR TEACHING A FOREIGN LANGUAGE

(75) Inventors: Michael C. Wood, Ross, CA (US); Jonathan Dariyanani, Long Island City, NY (US)

(73) Assignee: K12 Inc., Herndon, VA (US)

( * ) Notice: Subject to any disclaimer, the term of this patent is extended or adjusted under 35 U.S.C. 154(b) by 1067 days.

(21) Appl. No.: 11/508,032

(22) Filed: Aug. 21, 2006

(65) Prior Publication Data

US 2008/0059145 A1   Mar. 6, 2008

(51) Int. Cl.
G06F 17/28   (2006.01)

(52) U.S. Cl. .................. 704/5; 704/2; 704/3; 704/4; 704/8; 434/157

(58) Field of Classification Search .............. 704/2–8; 434/157

See application file for complete search history.

(56) References Cited

U.S. PATENT DOCUMENTS

| | | | |
|---|---|---|---|
| 3,670,427 A | | 6/1972 | Stolpen |
| 3,968,576 A | * | 7/1976 | Taylor .................. 434/180 |
| 4,406,626 A | * | 9/1983 | Anderson et al. ........... 704/270 |
| 4,541,069 A | | 9/1985 | Kanou et al. |
| 4,618,985 A | | 10/1986 | Pfeiffer |
| 4,633,435 A | | 12/1986 | Morimoto et al. |
| 4,706,212 A | * | 11/1987 | Toma .................. 704/2 |
| 4,787,038 A | * | 11/1988 | Doi et al. .................. 704/2 |
| 4,804,328 A | | 2/1989 | Barrabee |
| 4,884,972 A | | 12/1989 | Gasper |
| 5,010,495 A | | 4/1991 | Willetts |
| 5,178,542 A | | 1/1993 | Chigrinsky et al. |
| 5,203,705 A | | 4/1993 | Hardy et al. |
| 5,318,450 A | | 6/1994 | Carver |
| 5,486,111 A | | 1/1996 | Watkins |
| 5,503,560 A | * | 4/1996 | Stentiford .................. 434/167 |
| 5,602,982 A | | 2/1997 | Judd et al. |
| 5,649,826 A | * | 7/1997 | West et al. .................. 434/157 |
| 5,692,906 A | | 12/1997 | Corder |
| 5,727,950 A | | 3/1998 | Cook et al. |
| 5,788,504 A | | 8/1998 | Rice et al. |
| 5,823,788 A | | 10/1998 | Lemelson et al. |
| 5,882,202 A | | 3/1999 | Sameth et al. |

(Continued)

FOREIGN PATENT DOCUMENTS

DE   4018080 A1   12/1991

(Continued)

OTHER PUBLICATIONS

Office Action for U.S. Appl. No. 11/592,682, issued Sep. 18, 2009.

(Continued)

*Primary Examiner*—David R Hudspeth
*Assistant Examiner*—Lamont M Spooner

(57) ABSTRACT

A method and system for teaching a foreign language to a user who has knowledge of a base language is disclosed. The method and system may include assessing the user's proficiency in the target foreign language. The method and system may also include presenting a text to the user that includes both base language words and target foreign language words, where the amount of target foreign language words in the text depends on the user's assessed proficiency in the target foreign language.

35 Claims, 27 Drawing Sheets

U.S. PATENT DOCUMENTS

| | | | |
|---|---|---|---|
| 5,904,485 | A | 5/1999 | Siefert |
| 5,930,746 | A | 7/1999 | Ting |
| 6,017,219 | A | 1/2000 | Adams, Jr. et al. |
| 6,022,221 | A | 2/2000 | Boon |
| 6,039,575 | A | 3/2000 | L'Allier et al. |
| 6,064,856 | A | 5/2000 | Lee et al. |
| 6,077,085 | A | 6/2000 | Parry et al. |
| 6,097,381 | A | 8/2000 | Scott et al. |
| 6,141,528 | A | 10/2000 | Remschel |
| 6,146,148 | A | 11/2000 | Stuppy |
| 6,149,441 | A | 11/2000 | Pellegrino et al. |
| 6,186,794 | B1 | 2/2001 | Brown et al. |
| 6,234,802 | B1 | 5/2001 | Pella et al. |
| 6,285,993 | B1 | 9/2001 | Ferrell |
| 6,293,801 | B1 | 9/2001 | Jenkins et al. |
| 6,301,462 | B1 | 10/2001 | Freeman et al. |
| 6,305,942 | B1 | 10/2001 | Block et al. |
| 6,341,958 | B1 | 1/2002 | Zilberman |
| 6,347,943 | B1 | 2/2002 | Fields et al. |
| 6,438,515 | B1 | 8/2002 | Crawford et al. |
| 6,482,011 | B1 | 11/2002 | Lee et al. |
| 6,554,618 | B1 | 4/2003 | Lockwood |
| 6,633,742 | B1 | 10/2003 | Turner et al. |
| 6,643,493 | B2 | 11/2003 | Kilgore |
| 6,729,885 | B2 | 5/2004 | Stuppy et al. |
| 6,736,641 | B2 | 5/2004 | Quiroz |
| 6,755,657 | B1 | 6/2004 | Wasowicz |
| 6,775,518 | B2 | 8/2004 | Norcott et al. |
| 6,865,368 | B2 | 3/2005 | Hoyashita et al. |
| 6,871,043 | B2 | 3/2005 | Sanda |
| 6,884,074 | B2 | 4/2005 | Theilmann |
| 6,905,341 | B1 | 6/2005 | Whitaker et al. |
| 6,909,874 | B2 | 6/2005 | Holtz et al. |
| 6,996,366 | B2 | 2/2006 | L'Allier et al. |
| 6,999,954 | B2 | 2/2006 | Taggart et al. |
| 7,043,193 | B1 | 5/2006 | Vashi et al. |
| 7,050,753 | B2 | 5/2006 | Knutson |
| 7,052,277 | B2 | 5/2006 | Kellman |
| 7,052,278 | B2 * | 5/2006 | Johnson et al. ............. 434/156 |
| 7,085,707 | B2 | 8/2006 | Milner |
| 7,137,821 | B2 | 11/2006 | Jorgensen et al. |
| 7,210,938 | B2 | 5/2007 | Packard et al. |
| 7,260,355 | B2 | 8/2007 | L'Allier et al. |
| RE39,942 | E | 12/2007 | Fai et al. |
| 7,407,384 | B2 * | 8/2008 | Raya et al. .................. 434/167 |
| 7,527,498 | B2 * | 5/2009 | Matsoff ....................... 434/179 |
| 2001/0023059 | A1 | 9/2001 | Toki |
| 2001/0041330 | A1 | 11/2001 | Brown et al. |
| 2002/0058234 | A1 | 5/2002 | West et al. |
| 2002/0106615 | A1 | 8/2002 | Murray et al. |
| 2002/0164564 | A1 | 11/2002 | Fretwell, Jr. |
| 2003/0004702 | A1 | 1/2003 | Higinbotham |
| 2003/0040899 | A1 | 2/2003 | Ogilvie |
| 2003/0049593 | A1 | 3/2003 | Parmer et al. |
| 2003/0064354 | A1 | 4/2003 | Lewis |
| 2003/0077559 | A1 | 4/2003 | Braunberger et al. |
| 2003/0157468 | A1 | 8/2003 | Kasahara |
| 2003/0165800 | A1 | 9/2003 | Shaw et al. |
| 2003/0203343 | A1 | 10/2003 | Milner |
| 2004/0018479 | A1 | 1/2004 | Pritchard et al. |
| 2004/0023191 | A1 | 2/2004 | Brown et al. |
| 2004/0030781 | A1 | 2/2004 | Etesse et al. |
| 2004/0115597 | A1 | 6/2004 | Butt |
| 2004/0214152 | A1 | 10/2004 | Hoyashita et al. |
| 2004/0214153 | A1 | 10/2004 | McCormick et al. |
| 2005/0032027 | A1 | 2/2005 | Patton et al. |
| 2005/0053900 | A1 | 3/2005 | Kaufmann |
| 2005/0084829 | A1 | 4/2005 | Peters |
| 2005/0149316 | A1 | 7/2005 | Ushioda et al. |
| 2005/0175970 | A1 | 8/2005 | Dunlap et al. |
| 2005/0196733 | A1 | 9/2005 | Budra et al. |
| 2005/0255431 | A1 | 11/2005 | Baker |
| 2006/0019223 | A1 | 1/2006 | Wood et al. |
| 2006/0110711 | A1 | 5/2006 | Julia et al. |
| 2006/0115800 | A1 | 6/2006 | Daley |
| 2006/0195313 | A1 | 8/2006 | Voetberg et al. |
| 2008/0057480 | A1 | 3/2008 | Packard et al. |
| 2008/0059484 | A1 | 3/2008 | Packard et al. |
| 2008/0109207 | A1 | 5/2008 | Wood |

FOREIGN PATENT DOCUMENTS

| | | | |
|---|---|---|---|
| EP | 1482469 | A2 | 12/2004 |
| JP | 2-178688 | | 7/1990 |
| JP | 2002-229440 | | 8/2002 |

OTHER PUBLICATIONS

"An Interactive Video Program: TOPIC (Training for Oral Proficiency Interviewing Competence)," Gaby West Training and Traning Design, 1989.

"Thomson ELT Interactive Picture Dictionary CD-ROM Selected as Finalist for 2006 SIIA Codie Awards; Heinle Picture Dictionary Interactive CD-ROM recognized among Best Instructional Solutions for English Language Acquisition," Feb. 13, 2006, https://elt.Thomson.com/.

"Nova Development Announces New Berlitz Branded Foreign Language Software Programs Now Available in Spanish, French, German, and Italian; Complete Language Learning Solutions Provide Three Ways to Learn: Computer, Car, iPod," Nova Development Corporation, Jul. 11, 2006, http://www.businesswire.com.

"Book of Mormon stories diglot reader on computer," Neal S. Harmon, 2002, pp. 22-37.

"The Effect of a Video Diglot-Weave Method in Introducing Beginning Languages," Phyllis Gunderson, Dec. 1993.

"A brand new world for English instruction with interactive multimedia and the World Wide Web," Yuangshan Chuang, Jul. 1998, ACM SIGCUE Outlook.

* cited by examiner

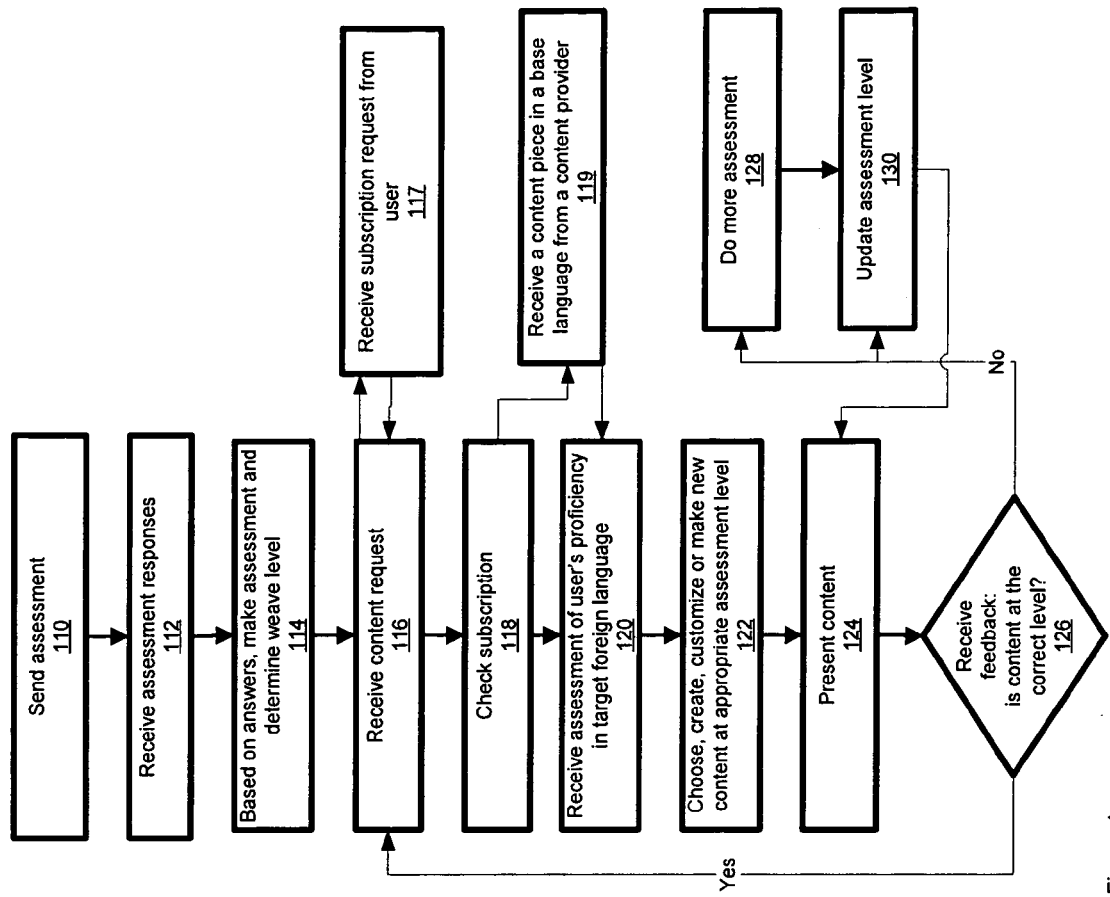
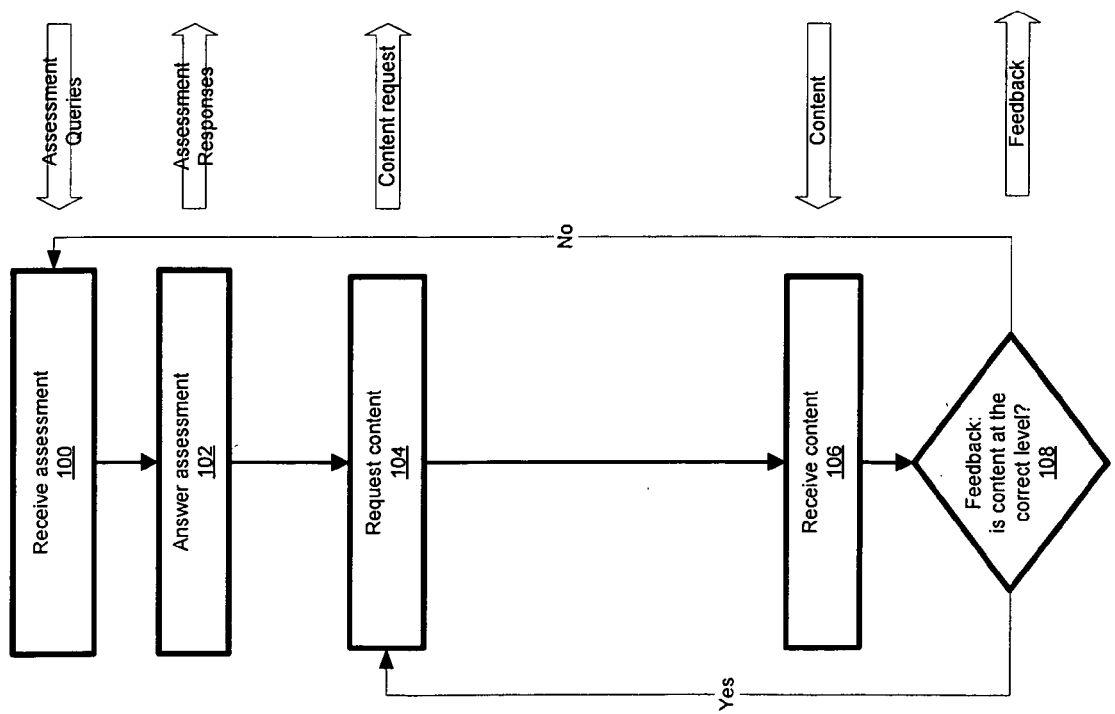
Figure 1

▲▲ NEXT LANGUAGE    INTERACTIVE LANGUAGE COURSES

BOLSA: Alright, so out with it.

SANCHO: Out with what?

BOLSA: The secret.

SANCHO: What secret?

BOLSA: The secret of where to find William. You said that Mrs. Morningstar told us where to find William. So, where is William?

SANCHO: William is at home.

Low proficiency level

NEXT LANGUAGE — INTERACTIVE LANGUAGE COURSES
BOLSA: Alright, so out with it.
SANCHO: Out with what?
BOLSA: The secreto.
SANCHO: What secreto?
BOLSA: The secreto of where to find William. You said that Senora Morningstar told us where to find William. So, where is William?
SANCHO: William is at home.
Low-Medium proficiency level 
Figure 13B

NEXT LANGUAGE
INTERACTIVE LANGUAGE COURSES
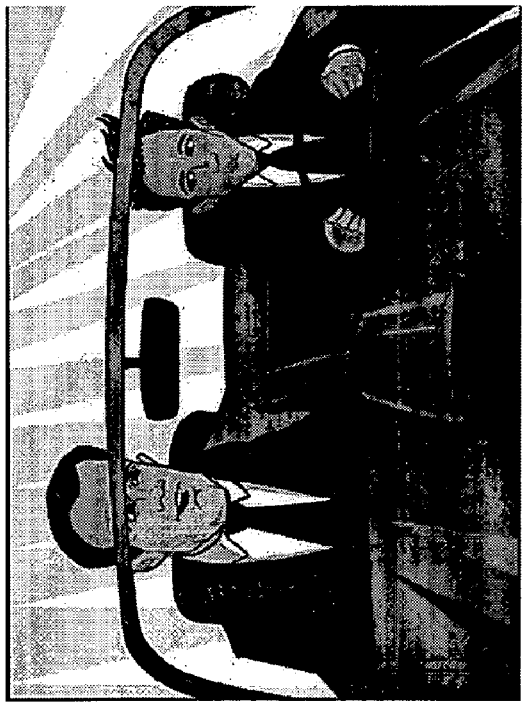
BOLSA: Alright, so out with it.
SANCHO: Out with que?
BOLSA: El secreto.
SANCHO: Que secreto?
BOLSA: The secreto of where to find William. You said that Senora Morningstar told us where to find William. So, donde esta William?
SANCHO: William esta en casa.
Medium-Low proficiency level
Figure 13C ▶▶ NEXT LANGUAGE | INTERACTIVE LANGUAGE COURSES
BOLSA: Bueno, entonces out with it.
SANCHO: ¿Suelto qué?
BOLSA: El secreto.
SANCHO: ¿Qué secreto?
BOLSA: El secreto of where to find William. Tú said que la señora Morningstar told us dónde encontrar a William. Entonces, ¿dónde está William?
SANCHO: William está en casa.
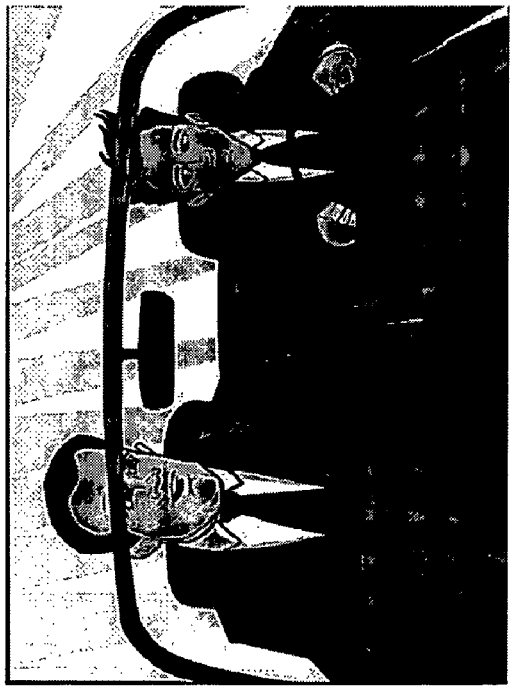
Medium proficiency level
*Flip*
Figure 13D BOLSA: Bueno, entonces out with it.

SANCHO: ¿Suelto qué?

BOLSA: El secreto.

SANCHO: ¿Qué secreto?

BOLSA: El secreto of where to find William. Tú dijiste que la señora Morningstar told us dónde encontrar a William. Entonces, ¿dónde está William?

SANCHO: William está en casa.

Medium-High proficiency level

NEXT LANGUAGE — INTERACTIVE LANGUAGE COURSES

BOLSA: Bueno, entonces sueltalo.

SANCHO: ¿Suelto qué?

BOLSA: El secreto.

SANCHO: ¿Qué secreto?

BOLSA: El secreto of where to find William. Tú dijiste que la señora Morningstar nos dijo dónde encontrar a William. Entonces, ¿dónde está William?

SANCHO: William está en casa.

High-Medium proficiency level

BOLSA: Bueno, entonces sueltalo.
SANCHO: ¿Suelto qué?
BOLSA: El secreto.
SANCHO: ¿Qué secreto?
BOLSA: El secreto de donde encontrar a William. Tú dijiste que la señora Morningstar nos dijo dónde encontrar a William. Entonces, ¿dónde está William?
SANCHO: William está en casa.
High proficiency level
Figure 13G

Low Level

Here's what you could be viendo next season
Invasión of pilotos brings a bunch of big-name stars

Por Gary Levin | 23 de Marzo, 2006

It's piloto season in Hollywood, cuando 100 new proyectos for next season compiten for the affections of network programadores -- and a slot on their fall calendarios.

A diferencia del last year, when Lost sparked a wave of sci-fi-tinged misterios (Threshold, Surface, Invasión), there are fewer obvious inspiraciónes. But Lost and 24 have emboldened networks to take more risks with serialized argumentos, flashbacks and high-stakes suspensos.

CBS, ya well-stocked with procedural crime shows, has none in development. ABC, with varias hit dramas, is most in need of comedias. Fox is dirigiendo development around the American Idol calendario, seeking compañeros for returning hits such as House, 24 and Prisión Break.

And NBC is en busca for, well, just about everything: More offbeat comedias in the vena of My Nombre Is Earl and a few "forward-thinking dramas," says programación chief Kevin Reilly. "We're reaching a little more ambiciosamente."

Often, the énfasis is on strong characters as opposed to crime-solving plot giros. New CBS proyectos are "digging deeper into relationships, and explorando and exploiting what conecta us to one another," says entretenimeinto chief Nina Tassler.

Figure 14A

Medium Level

Aquí está what you could be viendo next season
Invasión of pilotos brings a bunch of big-name estrellas

Por Gary Levin | 23 de Marzo, 2006

It's piloto season in Hollywood, cuando 100 nuevos proyectos for next season compiten for the affectos of network programadores -- and a slot on their fall calendarios.

A diferencia del last year, when Lost sparked a wave of ciencia ficción tinged misterios (Threshold, Surface, Invasión), there are fewer obvias inspiraciónes. But Lost and 24 have emboldened networks to take more riesgos with serialized argumentos, flashbacks and high-stakes suspensos.

CBS, ya well-stocked with procedural crimen shows, has none in development. ABC, with varias hit dramas, is most in necessidad of comedias. Fox is dirigiendo development around the American Idol calendario, seeking compañeros for returning hits such as Casa, 24 and Prisión Break.

And NBC is en busca for, well, just about everything: More offbeat comedias in the vena of My Nombre Is Earl and a few "forward-thinking dramas," says director de programación Kevin Reilly. "We're reaching a little more ambiciosamente."

Often, the énfasis is on strong characters as opposed to crime-solving plot giros. New CBS proyectos are "digging deeper into relationships, and explorando and exploiting what conecta us to one another," says entretenimeinto chief Nina Tassler.

Figure 14B

METHOD AND SYSTEM FOR TEACHING A FOREIGN LANGUAGE

BACKGROUND

Mastering a foreign language is a valuable tool that may be beneficial to one throughout one's life. However, current foreign language learning tools have several drawbacks that impede their utility. In U.S. Application 2006/0019223, a method and device for teaching foreign language is described. A fraction of the words in a text written in a known base language are replaced with synonymous words or phrases in a target foreign language that is being taught. The fraction of words that are replaced can be modified by the user.

Current foreign language learning tools may be able to teach users at different levels of proficiency. However, they are not able to assess a user's level of proficiency and custom-tailor a teaching tool for that user based on the user's assessed proficiency level.

One of the main hindrances to learning a foreign language is lack of time. Busy people often do not have the ability to set aside time on a regular basis to learn a new language. Existing foreign language learning tools utilize simple stories or mechanisms to teach the new language. However, they do not utilize resources which the user would already be reading to teach the new language, such as a magazine or newspaper article, thus maximizing use of the user's time.

Finally, current foreign language learning tools are often intimidating and boring, requiring memorization of rules and words.

BRIEF DESCRIPTION OF THE DRAWINGS

FIG. 1 is a flowchart illustrating an example procedure of teaching a foreign language, according to an example embodiment of the present invention;

FIGS. 13A-G illustrate the operation of another example application according to an example embodiment of the present invention;

FIGS. 14A-B illustrate an example subscription content presentation application according to an example embodiment of the present invention;

DETAILED DESCRIPTION OF EXAMPLE EMBODIMENTS

Figure 2:
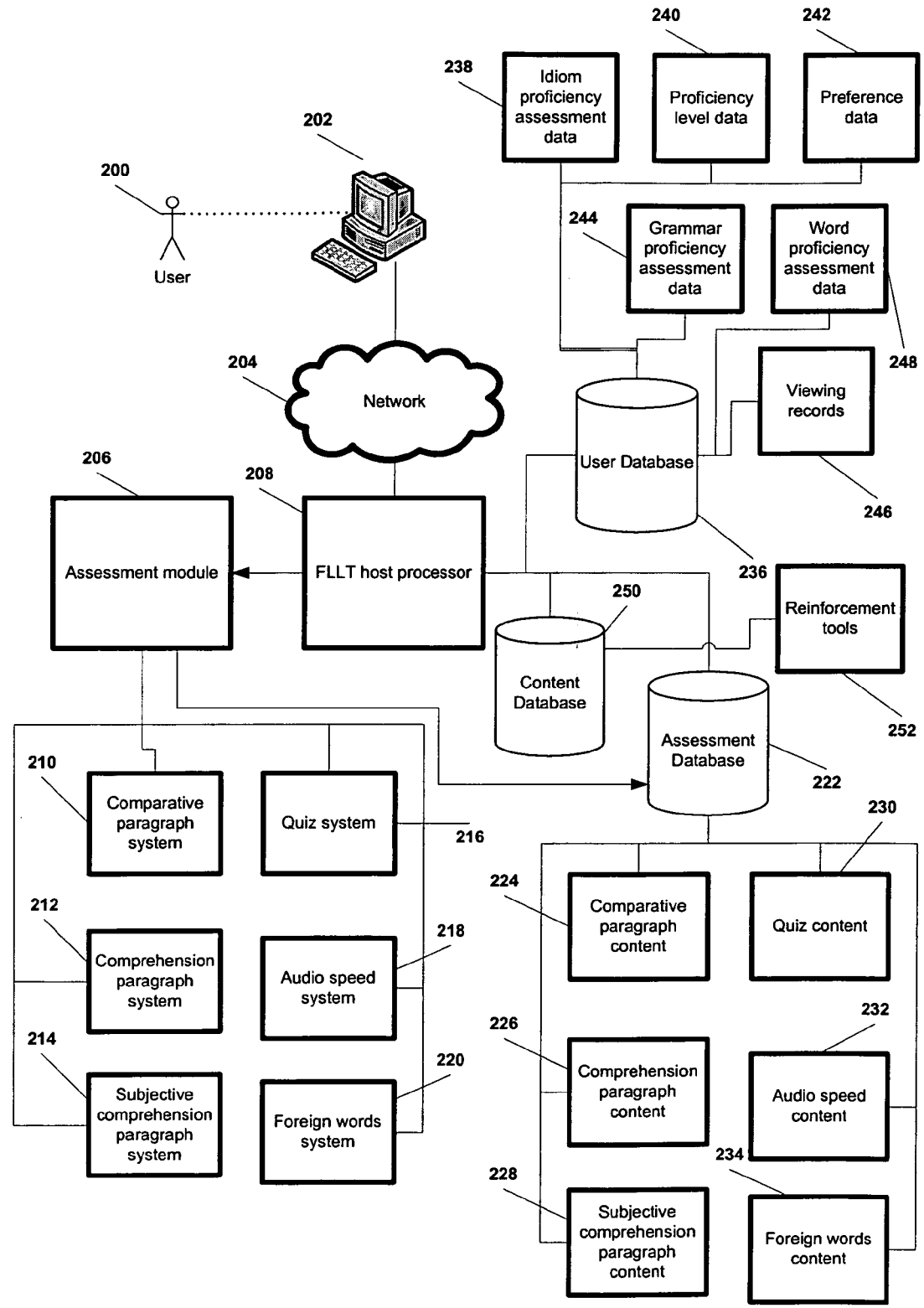
FIG. 2 illustrates an example foreign language learning tool (FLLT), according to an example embodiment of the present invention.

Some embodiments of the present invention may work cooperatively with existing computer systems or content sources to teach a target foreign language to a user with knowledge of a base language. In particular, methods for teaching a target foreign language and foreign language learning tools (FLLT) for teaching target foreign languages that make use of these methods may be provided. The methods and tools present users with content where the target foreign language and base user language are intermixed or "woven," e.g., by replacing words and phrases in a text in the base language with words and phrases in the target foreign language, or vice versa. In some example embodiments of the present invention, the user may be presented with content, including audio, text, or a combination, which is in the form of a weave, where various words and phrases are presented in a mixed format, some in the user's known base language and some in the user's target foreign language. These tools may operate in a stand-alone manner, or may be integrated with other programs, e.g., conventional content sources such as movies, newspapers, magazines, or Internet web pages, entertainment software including conventional computer or online games, educational software, or other sources of language that may be of interest to a user. By presenting the user with content that already interests them, the user's attention will be held, enabling them to learn additional elements of the target foreign language.

In some example embodiments, which words and phrases (or the amount of words and phrases) which are presented to the user in the base or the target foreign language may be determined based at least in part on the user's assessed proficiency in the target foreign language. Holding the user's attention and promoting language learning may be enhanced by altering the amount or nature of the language intermixing or "weaving" based on assessments of user proficiency. Presenting material that is too difficult may frustrate the user and prevent them from comprehending the material. Presenting material that is too easy may prevent learning at the optimal rate.

In some example embodiments of the present invention, when the user first activates the FLLT, the user's proficiency in the target foreign language may be assessed by a variety of assessment methods. Continuing assessments may be made of a user's proficiency as the FLLT is used, using a variety of proficiency assessment methods. Different types of assessment approaches may be employed including testing, user feedback on difficulty, user inquiries or use of a "help function," user pacing in reading or listening to a text, and other approaches for measuring or inferring the user's proficiency in the target foreign language.

Once the user's initial proficiency level has been determined by the FLLT, the FLLT may create a weave made up of words in the user's native language and some in the target foreign language, depending on the user's assessed proficiency level. In some example embodiments of the present invention, the user's proficiency test result(s) may be used in customizing the weave. For example, if during the proficiency test it is determined that the user is proficient in a certain target foreign language word, that word may automatically be presented in the weave in the target foreign language, regardless of the user's current overall proficiency level.

In other example embodiments of the present invention, several weaves of varying difficulty may be pre-prepared from a single content source. The appropriate level of weave may then be presented to the user who requests the content based on his proficiency level in the target foreign language. For example, if the user achieved a particular score on a proficiency test, the user may then be presented with a pre-prepared text corresponding to his level of proficiency. In this example embodiment of the present invention, there may be several different texts pre-prepared corresponding to different levels of user proficiency.

The weave that is provided to the user may be presented as an audio stream. The audio stream may contain a special intonation or pitch for the target foreign language words. For example, if the sentence being read to the user is: "The dog ran to the árbol," then there may be a special pitch or intonation used for the word "árbol." This change in pitch or intonation may serve to alert the user that the word being presented is a target foreign language word.

The weave may also be provided to the user visually, such as on the display screen of a computer. If the user holds the mouse over a target foreign language word, a translation of the word may appear adjacent to the target foreign language word. For example, if a sentence in the weave reads: "The girl went to her casa," then if the user holds the mouse over the word "casa," its translation, i.e. "house," may appear. Alternatively, if the user holds the mouse over a target foreign language word, its phonetic equivalent in the user's base language may appear adjacent to the word. For example, if a sentence in the weave reads: "The ילדה likes ice cream," then if the user holds the mouse over the word ""ילדה"" the word "yaldah" may appear. In addition, certain related words in the weave may be matched with one another using similar font, color, etc. The words may be related because they are the same parts of speech, such as a verbs, or they may be key matching words. For example, if a sentence in a weave reads: "She likes to eat gâteau and chocolat," the words "gâteau" and "chocolat" may appear in the same font or color as they are both nouns. As well, when the user places his mouse over a target foreign language verb, the root of the word may appear adjacent to the verb. For example, if a sentence in a weave reads: "Je suis a girl," then if the user holds the mouse over the word "suis," the root of the word may appear ("etre").

The weave may also be presented to the user both visually and as an audio stream. For example, the weave may be displayed on a computer screen while it is read to the user. Once the weave has been created or selected for the user, the weave may then be presented to the user.

As the user is presented with the weave, the user's proficiency may be constantly reassessed using the same mechanisms that initially assessed the user's proficiency. Then, the FLLT may increase or decrease the level of difficulty in the text based on the user's proficiency. For example, as the user is presented with a text, he may indicate whether he is proficient in each target foreign language word in that text, and at what level of proficiency. Then, subsequent weaves presented to the user may incorporate the user's specific knowledge of the target foreign language by automatically presenting to the user all the words that he indicated as being proficient with in the target foreign language.

The content of the weave presented to the user may be derived from different sources. In some example embodiments of the present invention, the content of the weave may be derived from a fictional or original story. In another example embodiment of the present invention, the content of the weave may be derived from a magazine or newspaper article to which the user subscribes. For example, the user may be presented with an article from Time Magazine or Sports Illustrated. In another example embodiment of the present invention, the content of the weave may be extracted from an internet web page.

The user may be assessed using audio files, text files and/or video files. In one example embodiment of the present invention, the user may be presented with a number of different screen shots that contain a representative paragraph in different proficiency levels in the target foreign language. For example, one paragraph may embody a low level of proficiency in the target foreign language, one paragraph may embody a medium level of proficiency in the target foreign language, one paragraph may embody a medium-high level of proficiency in the target foreign language, and one paragraph may embody a high level of proficiency in the target foreign language. The user may select the paragraph which the user feels best represents his level of competency in the target foreign language, in the same manner that one may select the lens that gives one the best vision using a phoropter at an optician's or ophthalmologist's office. In another example embodiment of the present invention, the user may be presented with a representative paragraph made up of words from both the user's native language and the target foreign language and asked a series of subjective questions in relation to that paragraph, such as how comfortable the user was with the level of difficulty of the text. In another example embodiment of the present invention, the user may be presented with a representative paragraph made up of words from both the user's native language and the target foreign language and asked to indicate whether he has knowledge of the target foreign language words. For each target foreign language word in the paragraph, the user may indicate whether he is proficient in that word presented, and, if so, and at what level of proficiency. The user may have several options with which to describe his level of proficiency for each target foreign language word, such as "proficient," "not proficient," and "aware." In another example embodiment of the present invention, the user may be presented with an audio stream made up of words from both the user's native language and the target foreign language, and may be able to select the speed at which he wishes the text to be read to him. The text may initially be presented to the user at the slowest speed, and the user may indicate whether he wants the speed to be increased, and by how many times. For example, the user may request to have the speed increased by four times. If the user finds the newly requested level is too fast, he may request the speed to be decreased. In another example embodiment of the present invention, the user may be presented with a representative paragraph made up of words from both the user's native language and the target foreign language and asked a series of comprehension questions relating to the paragraph. In another example embodiment of the present invention, the user may complete one or more comprehension exercises designed to test proficiency in the target foreign language. For example, the user may be asked to read a sentence and identify words that he recognizes. Alternatively, the user may be asked to read a sentence and identify words that he does not recognize.

In some embodiments of the present invention, once the user has already performed an initial proficiency test, the next time the user accesses the FLLT, he may have the option of skipping the proficiency test, and may be presented with a weave based on his already-assessed level of proficiency. In another example embodiment of the present invention, the user may be required to perform a proficiency test each time he accesses the FLLT.

One example embodiment of the present invention may include a method that teaches a user with knowledge of a base language a target foreign language. The user may be presented with a text that includes both base language words and target foreign language words. The amount of target foreign language words in the text may depend on the user's assessed proficiency in the target foreign language. In some example embodiments of the present invention, the text may be presented to the user by displaying it on a video display screen. In some example embodiments of the present invention, the text may be presented to the user in audio form. In some example embodiments of the present invention, the text may be simultaneously presented to the user by displaying it on a video display screen and in audio form.

In some example embodiments of the present invention, the text may be initially received in the base language and in the target foreign language and a set of mixed language texts may be prepared by either substituting target foreign language words for base language words in the base language text or substituting base language words for target foreign language words in the target foreign language text. Each text in the set of mixed language texts may have a respectively decreasing amount of base language words and a respectively increasing amount of target foreign language words. Based on the user's assessed proficiency, one of the set of mixed language text may then be chosen as the text for presentation to the user.

In some example embodiments of the present invention, the user may be asked questions about the content of presented text. The user's answers to the questions about the content of the presented text may then be received. The assessment of the user's proficiency in the target foreign language may then be updated based on the answers received from the user to the questions about the content of the presented text.

In some example embodiments of the present invention, the user's familiarity with a word in the target foreign language may be assessed. Then, based at least in part on of the assessment of the user's familiarity with the word in the target foreign language, the word in the text may be included as a target foreign language.

In some example embodiments of the present invention, words in the text which the user is proficient with in the target foreign language may be identified. Then, when presenting the text to the user, all the words in the text which are identified as words the user is proficient with may be presented in the target foreign language. Additionally, when presenting text to the user, a subset of the words in the text which are not identified as words the user is proficient with in the target foreign language may be presented in the target foreign language.

In some example embodiments of the present invention, the user may be asked to indicate a level of familiarity with a word in the target foreign language. Then, the user's proficiency with the word in the target foreign language may be estimated, based on the user's indication. In some example embodiments of the present invention, the speed at which the user reads the text may be measured. Then, based at least in part on the reading speed measurement, the assessment of the user's proficiency with the target foreign language may be updated. In some example embodiments of the present invention, the speed at which the user listens to an audio version of the text may be measured. Then, based at least in part on the listening speed measurement, the assessment of the user's proficiency with the target foreign language may be updated. In some example embodiments of the present invention, user input may be received which indicates that the user wants help with a target foreign language word. The user may then be provided with additional information about the target foreign language word. The assessment of the user's proficiency of the target foreign language may be updated based at least in part on the user's request for help with the target foreign language word. In some example embodiments of the present invention, a user request to repeat a portion of the text may be received. Then, the assessment of the user's proficiency in the target foreign language may be updated based at least in part on the user's request to repeat the portion of the text. In some example embodiments of the present invention, a user request to change the difficulty of the presented text may be received. Then, the assessment of the user's proficiency in the target foreign language may be updated based at least in part on the user's request to change the difficulty of the presented text.

One example embodiment of the present invention may include a method for teaching a target foreign language. A content piece in a base language may be received from a content provider. Then, a request for the content from a user may be received. An assessment of the user's proficiency in the target foreign language may also be received. A mixed language version of the content piece may then be provided to the user, the amount of target foreign language in the mixed language version of the content piece depending on the assessment of the user's proficiency in the target foreign language.

In some example embodiments of the present invention, the content piece may be provided as part of an Internet subscription service to which the user subscribes. In some example embodiments of the present invention, a subscription request may be received from a user. In some example embodiments of the present invention, the content piece may be a news article. In some example embodiments of the present invention, the content piece may be an audiovisual story. In some example embodiments of the present invention, the content piece may be a novel. In some example embodiments of the present invention, the content piece may be an audio stream. In some example embodiments of the present invention, an indication of the user's familiarity with a set of words in the content may be received. Based on the indication, words may be selected in the content piece. Then, target foreign language words may be substituted for the selected words prior to presenting the mixed language version of the content piece to the user. In some example embodiments of the present invention, input from the user may be received indicating the user's ability to understand the target foreign language portion of the mixed language version of the content piece. A second content piece in the base language may be received from the content provider. Then, a mixed language version of the second content piece may be provided to the user, the amount of target foreign language in the mixed language version of the second content piece depending on the input received from the user.

Other example embodiments of the present invention may include a system for teaching a target foreign language to a user with knowledge of a base language made up of a content database storing a set of story texts in a base language. The system may also include a set of assessment routines, each assessment routine providing an indication of user proficiency in the target foreign language. Further, the system may include a processor configured to receive assessments of the user's proficiency in the target foreign language from the assessment routines and to provide a mixed language version of one of the story texts, the amount of target foreign language in the mixed language version of the one of the story texts depending on the received assessments.

In some example embodiments of the present invention, the content database may be able to store multiple versions of each of the set of story texts, each successive version having respectively more target foreign language and less base language words; and the processor may be configured to select one of the stored multiple versions of a story text based on the received assessments. In some example embodiments of the present invention, a user proficiency database may be accessible to the processor, the user proficiency database containing records indicative of the user's familiarity with words in the target foreign language. In some example embodiments of the present invention, the records may further include an indication of whether a word has been presented to the user by the system. In some example embodiments of the present invention, the records may further include an indication of how many times a word has been presented to the user by the system. In some example embodiments of the present invention, for a single user there may be multiple records provided for a word with multiple meanings, each record corresponding to a different meaning of the word. In some example embodiments of the present invention, the user proficiency database may also include records for idioms. In some example embodiments of the present invention, the user proficiency database may also include records for phrases. In some example embodiments of the present invention, the processor may be configured to receive information from the user proficiency database, and, based on the received information, to select words in the one of the story texts and replace the selected base language words with target foreign language words. In some example embodiments of the present invention, an audio output device may be in communication with the processor, the audio output device configured to output an audio version of the mixed language version of the one of the story texts to the user. In some example embodiments of the present invention, a video output device may be in communication with the processor, the video output device configured to output a video corresponding to one of the story texts. In some example embodiments of the present invention, the system may also consist of a set of questions and answers regarding the content of one of the story texts. In some example embodiments of the present invention, at least one of the assessment routines may be configured to query the user regarding the user's subjective comfort with the amount of target foreign language in the mixed language content presented to the user. In some example embodiments of the present invention, at least one of the assessment routines may be configured to assess the user based on the user's response time. In some example embodiments of the present invention, the system may also consist of a help system. The help system may be configured to respond to user requests for assistance in understanding the mixed language content. In some example embodiments of the present invention, the help system may include a dictionary look-up system that may be configured to allow the user to look-up the meaning of a target foreign language word in the base language. In some example embodiments of the present invention, at least one of the assessment routines may configured to indicate user proficiency based on the frequency the user makes use of the help system.

FIG. 1 is a flowchart illustrating an example target foreign language learning procedure, according to an example embodiment of the present invention. The flowchart illustrates the procedure both from the perspective of a user (on the left) and from the perspective a system implementing the procedure on a right).

In 100, the user may receive a preliminary proficiency assessment. In 102, the user may provide answers to the assessment. The assessment may take a variety of forms, e.g., a series of substantive questions, grammar and vocabulary questions, etc. Alternatively, the preliminary assessment may be conducted in a manner similar to an optometry examination, where the patient compares views through a phoropter, by simultaneously presenting texts at different difficulty levels and having the user identify the texts which are comfortable or comprehensible.

In 104 the user may request content, e.g., a news story, a child's story book, a magazine article, or other content of interest to the user.

In 106, the requested content may be provided to the user. However, the content that is provided, rather than simply being provided in the base language, may be provided as a weave of the base and target foreign language. The particular weave provided may be automatically selected based on the present assessment of user proficiency in the target foreign language, or on assessment of the user's proficiency regarding particular words and phrases that are in the content. For example, all words that the user is known to be proficient in may be provided in the target foreign language. A portion of words that the user is acquainted with may also be provided in the target foreign language. A small number of words that the user is not acquainted with in the target foreign language may also be provided in the target foreign language.

In 108, the user may provide feedback on the content provided. The feedback may be provided explicitly, e.g., by clicking on a "too hard", "too easy" or "just right" button provided for the purpose of collecting feedback. Alternatively, the feedback may be inferred indirectly, e.g., by how frequently the user refers to a help or dictionary function, by how fast the user reads the text, by how often the user requests an audio to be repeated, or by the soliciting answers to questions on a quiz which tests the user's comprehension. If the difficulty level is appropriate, additional content may be provided, e.g., by returning to 104. If there is a problem with the difficulty level, additional assessment may be made, e.g., by returning to 100, and, if needed the difficulty level may be modified.

The system portion of the example procedure may be provided by an FLLT, or integrated in some other system that provides content to a user. In 110, the FLLT may send an assessment to the user. In 112, the FLLT receives the assessment completed by the user. This assessment may be, for example, presenting the user with several different versions of the same paragraph weave which correspond to varying proficiency levels in the target foreign language, and requiring the user to choose the one with which s/he is most comfortable, or the most difficult one which is comprehensible. (These methods may be altered depending on the user. Some users may gravitate toward the easiest passages; other users will naturally seek to read the passage that tests their abilities.)

Alternatively, the assessment may be presenting the user with a paragraph weave in a certain proficiency level and asking the user several comprehension questions regarding the paragraph or asking the user subjective questions regarding the user's comfort level based on the paragraph. The assessment may also be, for example, presenting the user with a paragraph weave and asking the user to indicate whether he has knowledge of the target foreign language words in the paragraph. For example, the user may be asked to click on each target foreign language word they know (or do not know) in the sample. Alternatively, a dial or scroll bar (or multiple choice) may be provided for each word, allowing a user to self-assess their relative degree of comfort or familiarity with each word. For example, the user may be presented with the following sentence: "The perro ran to fetch the stick." The user may be asked to indicate whether he is proficient, aware or not proficient of the target foreign language word presented, i.e. "perro". The user may indicate that he is proficient with "perro," because he knows it means "dog."

Alternatively, the assessment may be presenting the user with an audio stream made up of a paragraph weave, and asking the user to select the speed at which he wishes the text to be read to him; user's may tend to want the passage to be read more slowly as their level of comprehension drops. Similarly, reading speed may be used as a proxy for proficiency, although care must be taken to detect a reader or is not comprehending or disinterested and merely clicking through the content at a high rate.

Another example approach to assessing proficiency may be the use of substantive questions that measure comprehension. The assessment may be, for example, to have the user complete one or more comprehension exercises designed to test his proficiency in the target foreign language. The user may answer the assessment by following the instructions given to him, as described in relation to 110. In some example embodiments of the present invention, the assessment of the user may determine specific strengths and/or weaknesses the user has in the target foreign language being studied by the user.

It will be appreciated that a variety of other approaches may be used for assessment. Specific information relating to the user's knowledge of particular words may be stored by the FLLT and used to customize learning exercises presented to the user in the future.

In 114, based on the answers provided by the user in the assessment, the FLLT may assess the user's proficiency in the target foreign language and may determine an appropriate weave level. For example, the user may be presented with different paragraphs embodying low, medium and high levels of proficiency in Spanish, respectively, and the user may indicate that he is most comfortable with the paragraph that embodies the medium level of proficiency in Spanish. The FLLT may then assess the user's proficiency based on the user's indicated comfort level. The weaves that are provided may be pre-selected based on a general proficiency level, or custom prepared based on a user's particular proficiency with words in a provided piece of content.

In 116, the FLLT receives the user request for content. This content may be, for example, a magazine article or a webpage containing a weave of native language and target foreign language words. In 117, a subscription request may be received from a user. In 118, if the user requested content from a resource which requires a subscription, such as a subscription-based business, sports, or fashion magazine, the FLLT checks to ensure that the user is a subscriber to that resource. In 119, a content piece in a base language is received from a content provider. In 120, the FLLT receives an assessment of the user's proficiency in the target foreign language. The FLLT has already assessed the user's proficiency in the initial assessment test, and has stored this information. In 122, the FLLT chooses, creates, or customizes content for the user at the appropriate weave level. For example, the FLLT may choose from weaves which were pre-prepared at different proficiency levels. Before the user performs a proficiency test, the FLLT may create weaves at various proficiency levels, such as low, low-medium, medium-low, medium, medium-high, high-medium, and high, and may present the user with the weave that most closely corresponds to the user's proficiency level. Alternatively, the FLLT may create a new weave based on the proficiency level of the user. The content for the weave may be derived from fictional or original stories, from an internet web page or from a service to which the user subscribes. The FLLT may also customize a weave for the user based on his specific knowledge of various target foreign language words. The FLLT may have stored information relating to the user's specific knowledge of the target foreign language during the proficiency test, and may use this knowledge in customizing a weave. For example, if the user is not proficient with the word "horse," the FLLT may insert the target foreign language equivalent of this word in the weave only a small fraction of the time it appears. As well, the FLLT may create new content and convert it to a weave at the appropriate proficiency level. In 124, the content may be presented to the user at the appropriate weave level, based on the user's assessed language proficiency. The weave may be presented to the user in audio format, in text format, or both. If the content is at the appropriate level, the user may request additional content at the same proficiency level. If the content is not at the appropriate level, the user may be provided with an additional assessment to determine his correct proficiency level.

In 126, the FLLT receives feedback indicating whether the content presented to the user is at the appropriate level. If the content is at the appropriate level, the FLLT may receive a request form the user to provide additional content at the same proficiency level. If the content is not at the appropriate level, in 128, the FLLT may do additional assessment and, in 130, modify the assessment level. Then, in 124, the FLLT may present content to the user at the new proficiency level.

FIG. 2 illustrates an example FLLT, according to example embodiment of the present invention. A user 200 may access the target foreign language learning tool through an input/output (I/O) device 202, such as a keyboard or mouse, for example, attached to a desktop. The I/O device 202 may access the FLLT host processor 208 via a network 204. The user 200 may be assessed by the assessment module 206 to determine his proficiency level. The assessment module 206 may assess the user 200 using various systems. For example, the assessment module 206 may assess the user 200 using the comparative paragraph system 210. The user 200 may be presented with several versions of the same paragraph in varying levels of proficiency, and asked to choose the one with which he feels the most comfortable. The assessment module 206 may obtain the data to use in conjunction with the comparative paragraph system 210 from the comparative paragraph content 224 in the assessment database 222. As another example, the assessment module 206 may assess the user 200 using the target foreign language words system 220. The user 200 may be presented with one or more sentences containing a mixture of base language and target foreign language words, and asked to define his level of proficiency for each target foreign language word. The user 200 may define his level of proficiency with the Spanish word for "dog" ("perro"), for example, as medium. The assessment module 206 may obtain the data to use in conjunction with the target foreign language words system 220 from the target foreign language words content 234 in the assessment database 222. In addition, the assessment module 206 may assess the user 200 using the quiz system 216. The user 200 may be presented with one or more exercises designed to determine the user's level of proficiency and specific areas of strength and weakness. The assessment module 206 may obtain the data to use in conjunction with the quiz system 216 from the quiz content 230 in the assessment database 222. For example, the assessment module 206 may assess the user 200 using the comprehension paragraph system 212. The user 200 may be presented with a paragraph containing a mixture of base language and target foreign language words, and asked to complete a series of comprehension questions based on the paragraph. The assessment module 206 may obtain the data to use in conjunction with the comprehension paragraph system 212 from the comprehension paragraph content 226 in the assessment database 222. As another example, the assessment module 206 may assess the user 200 using the subjective comprehension paragraph system 214. The user 200 may be presented with a paragraph containing a mixture of base language and target foreign language words, and asked to complete a series of subjective questions based on the paragraph. The user 200 may be asked, for example, whether the paragraph was at a comfortable proficiency level. The assessment module 206 may obtain the data to use in conjunction with the subjective comprehension paragraph system 214 from the subjective comprehension paragraph content 228 in the assessment database 222. The assessment module 206 may also assess the user 200 using the audio speed system 218. The user 200 may be presented with an audio stream made up of a paragraph which is a mixture of base language and target foreign language words, and asked to indicate whether the speed is too fast, too slow, or comfortable. The assessment module 206 may obtain the data to use in conjunction with the audio speed system 218 from the audio speed content 232 in the assessment database 222.

Once the user 200 has been assessed, his proficiency level 240 and other information relating to his specific knowledge of the target foreign language may be stored in the user database 236, such as word proficiency assessment data 248, idiom proficiency assessment data 238 and grammar proficiency assessment data 244. For example, if the assessment module determines that the user has a high level of proficiency in the Spanish word for "cat" ("gato"), that information would be stored as word proficiency assessment data 248 in the user database 236. In addition, information relating to user preferences 242 and the viewing records 246 of the user may be stored in the user database 236.

Once the user 200 had been assessed by the assessment module 206, the user 200 may be presented with content from the content database 250. The content may be custom-tailored to the specific user 200 based on the information stored in the user database 236. The content database 250 may contain various types of content that may be presented to the user 200. For example, the user 200 may be presented with audio content. Alternatively, the user 200 may also be presented with video content. In addition, the user 200 may be presented with text content.

The content database 250 may also contain reinforcement tools 252 which may be used to coach the user 200. The reinforcement tools 252 may use the data stored in the user database 236 to reinforce the meaning of words, idioms, or grammar concepts which the user 200 did not comprehend. The user 200 may be presented with coaching sessions by the reinforcement tools 252 with respect to the words, idioms, or grammar concepts which the user 200 did not comprehend. For example, the user 200 may be shown a word which he is not proficient with and asked to repeat it and its translation several times. As another example, the user 200 may be presented with a sentence where a grammar concept he is not familiar with is utilized, and the grammar concept may be highlighted and explained.

Figure 3:
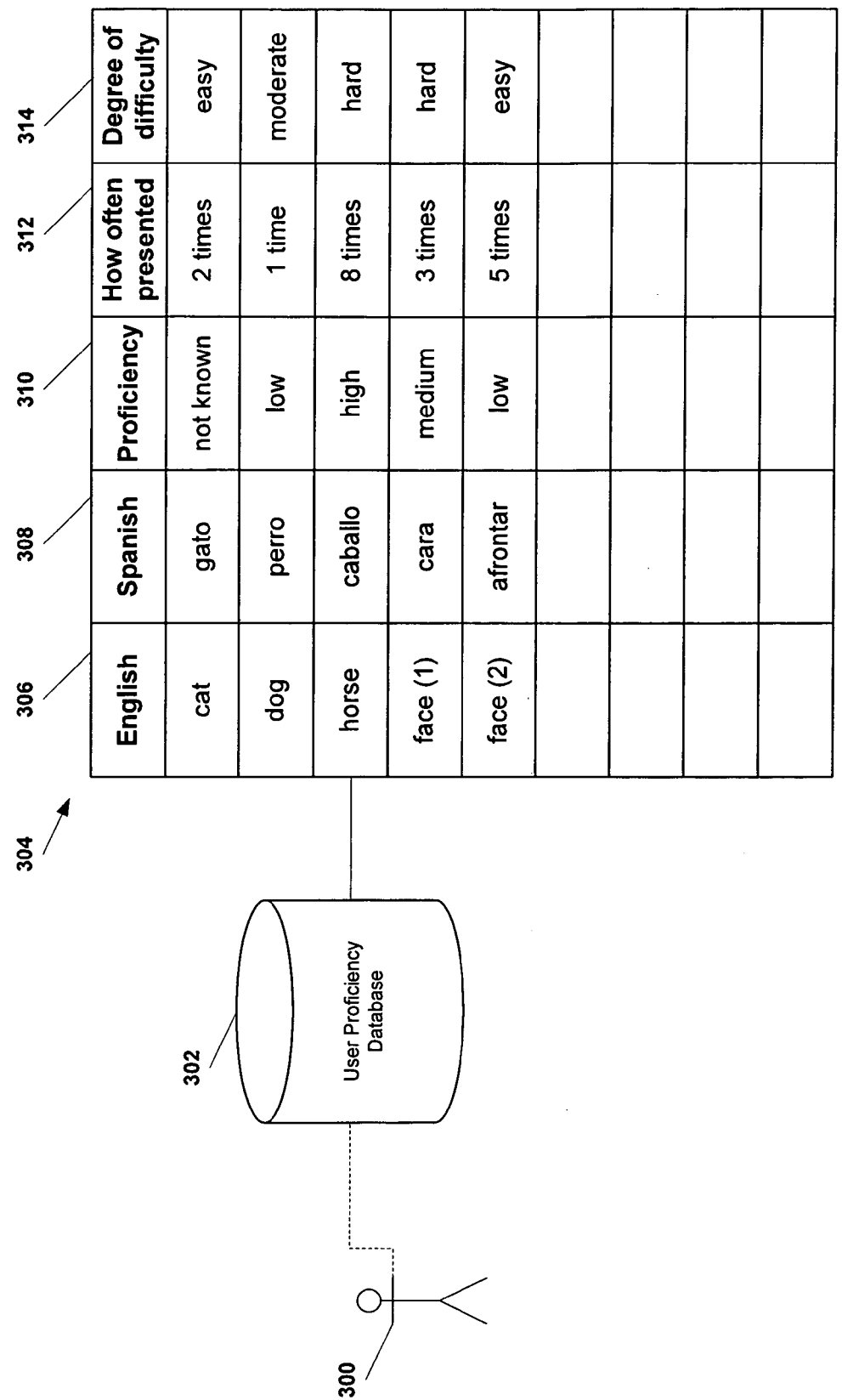
FIG. 3 is a simplified block diagram of an example user proficiency database stored in memory, according to an example embodiment of the present invention.

FIG. 3 is a simplified block diagram of an example user proficiency database stored in memory of an FLLT system, according to an example embodiment of the present invention. A user 300 may access a user proficiency database 302 stored in memory which has a separate set of records 304 for each user. The set of records 304 may contain a column 306 of a list of words in the user's native language. For example, if the user's native language is English, the word "cat" may appear in this column. In addition to a list of words, the set of records 304 may also contain grammar concepts. The set of records 304 may also contain a column 308 with translation of the list of words into the target foreign language being studied by the user. For example, if the language being studied by the user is Spanish, the word "gato" may appear in this column as a translation of "cat." For each word stored in the set of records 304, there may be a column 310 indicating the user's proficiency with the word. For example, the user may have a high level of proficiency with the word, or the user's proficiency may be unknown. For each word stored in the set of records 304, there may be a column 312 indicating how often each word has been presented to the user. For each word stored in the set of records 304, there may be a column 314 indicating the degree of difficulty of the word presented to the user. The set of records stored in the user proficiency database 302 may be used by the FLLT in customizing a weave for a user in accordance with the method set forth in FIG. 5.

Figure 4:
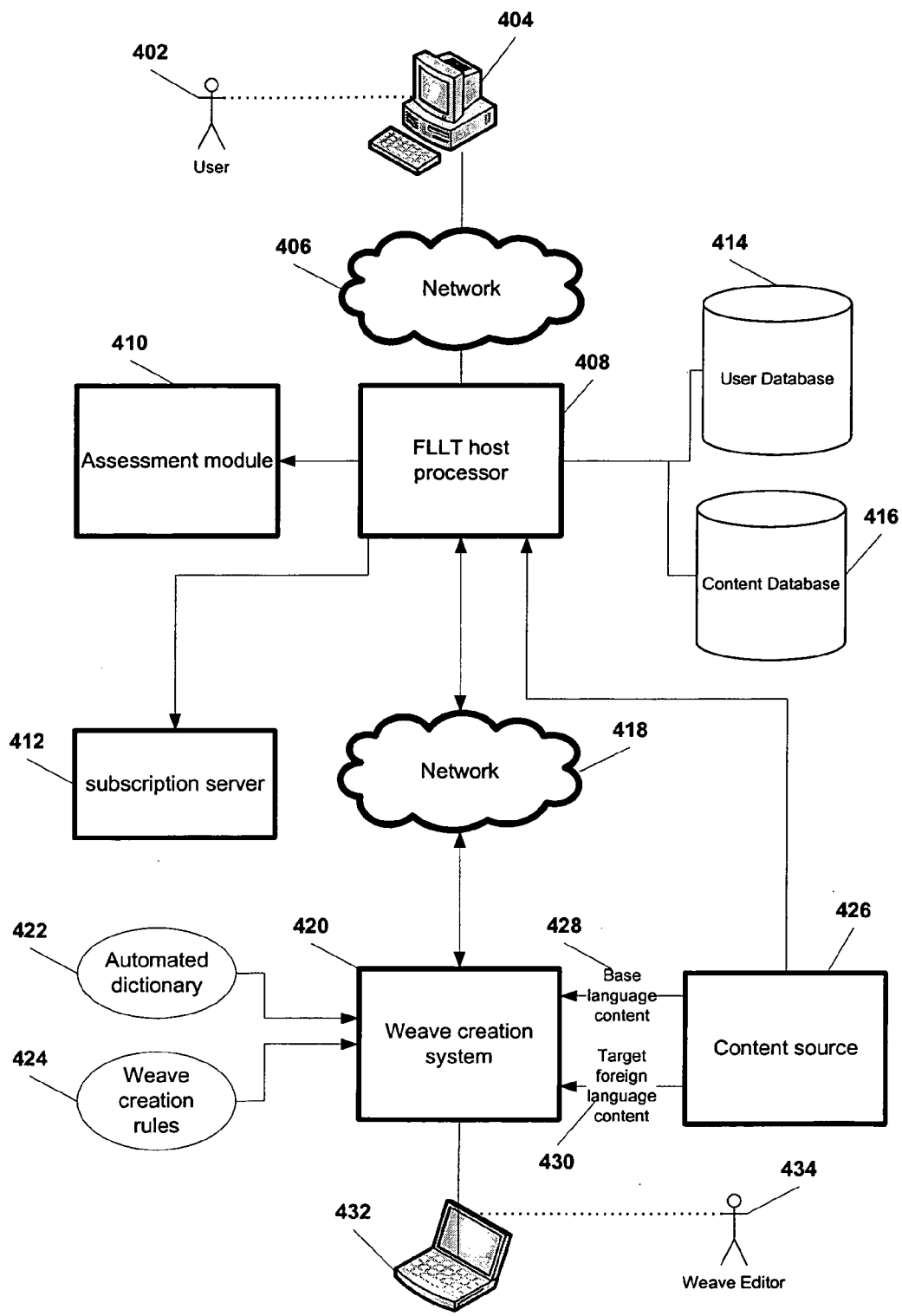
FIG. 4 illustrates an example FLLT integrated with a subscription content service, according to an example embodiment of present invention.

FIG. 4 illustrates an example FLLT integrated with a subscription content service, according to an example embodiment of present invention. A user 402 may access the FLLT through an input/output (I/O) device 404, such as a keyboard or mouse, for example, attached to a desktop. The I/O device 404 may access the FLLT host processor 408 via a network 406. The user 402 may then be assessed by the assessment module 410 to determine his proficiency level. Once the user 402 has been assessed, his proficiency level and other information relating to his specific knowledge of the target foreign language may be stored in the user database 414. For example, if the assessment module 410 determines that the user has a medium level of proficiency in the Spanish word for "horse" ("caballo"), that information would be stored in the user database 414. The user 402 may request specific content via the I/O device 404, such as a magazine article from People Magazine. The FLLT host processor 408 may access the subscription server 412 to determine whether the user 402 is a subscriber to the content source 426 which it requested. If the user 402 is not a subscriber to the content source 426, the user 402 may be denied access to the content source 426. If the user 402 is a subscriber to the content source 426, the FLLT host processor 408 may access the requested content source 426. The requested content may be stored in the content database 416. The weave creation system 420 may access the base language content 428 and the target foreign language content 430 stored in the content database 416. Using an automated dictionary 422 and weave creation rules 424, a weave editor 434 may create a weave via a processor 432. The weave creation rules 424 may be dynamic and may be continuously be updated based on information in the user database 414. The weave may be customized for the specific user 402 who requested it, using the information in the user database 414. The weave may then be provided to the user.

A woven target foreign language training system may be presented to the user as a separate subscription system, e.g., the user may subscribe to the system, e.g., through a specialized Internet website. The user may then choose from various content sources available at the website, such as magazine articles, newspaper articles, TV series, and other content that is regularly available. Instead of receiving them in their original form, they may be presented to the user in the woven language format. Thus, the user may almost painlessly improve his target foreign language skills by reading materials that he finds engaging and interesting. As an alternative to a subscription to the language training service, the provider of woven content may provide dual-language woven content to information content providers, such as online subscription magazines. The magazines could then provide the woven content free as a value-added service to their regular subscribers. So, for example, a busy business executive could read his regular business publications and improve his target foreign language skills at the same time.

Figure 5:
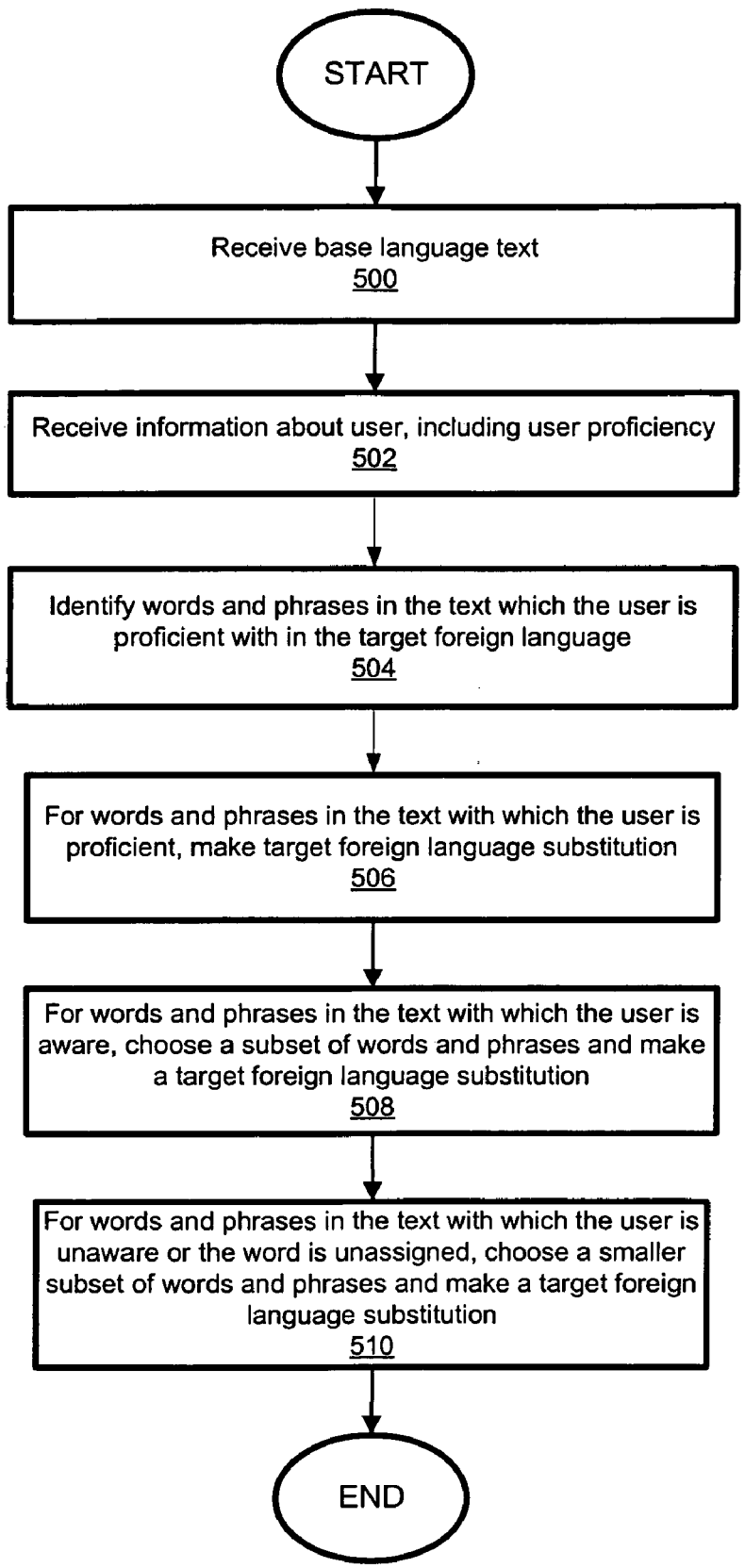
FIG. 5 is a flowchart illustrating an example procedure for creating a customized text for a specific user made up of both base language and target foreign language words, according to an example embodiment of the present invention.

FIG. 5 is a flowchart illustrating an example procedure for creating a customized text weave that operates in conjunction with the block diagram of FIG. 2, according to an example embodiment of the present invention. In 500, the FLLT receives text in the user's base language, such as English. The text may be, for example, a newspaper article or a magazine article. In 502, the FLLT receives information about the user, including the user's proficiency data. This information may be, for example, the user's proficiency level in the target foreign language. Alternatively, this information may be a set of records, such as that depicted in FIG. 2, indicating the user's proficiency with specific words in the target foreign language. In 504, the words and phrases that the user is proficient with in the target foreign language are identified. In 506, all words or phrases with which the user is proficient in the target foreign language may be substituted into the text. For example, if the table indicates that the user is proficient with the translation of the word "cat", all instances of "cat" will be replaced with its target foreign language equivalent, such as "gato" in Spanish. In 508, a subset of all words or phrases with which the user is aware is substituted into the text. For example, if the user is aware of the translation of the word "dog" but is not yet proficient with it, some incidents of the word "dog" in the text will be replaced with its target foreign language equivalent, such as "perro" in Spanish. In 510, a subset of all words or phrases with which the user's proficiency is unknown is substituted into the text. For example, if it is unknown whether the user is proficient with the translation of the word "horse," some incidents of the word "horse" in the text will be replaced with its target foreign language equivalent, such as "caballo" in Spanish. The subset of words substituted into the text for an unknown word may be less than the subset of words substituted into the text for words which the user is aware but not yet proficient.

The exemplary procedure illustrated in FIG. 5 describes a situation where the original text received is in the user's base language, and a number of target foreign language words are substituted into that base language text to create a weave. However, this method is also operable when the original text received is in the user's target foreign language. In that situation, a number of base language words may be substituted into the target foreign language text to create a weave. None of the words with which the user is proficient in the target foreign language may be replaced by base language equivalent words in the text. A subset of the words with which the user is aware in the target foreign language may be replaced by base language equivalent words in the text, and a larger subset of words with which the user's proficiency is unknown in the target foreign language may be replaced by base language equivalent words in the text.

Figure 6:
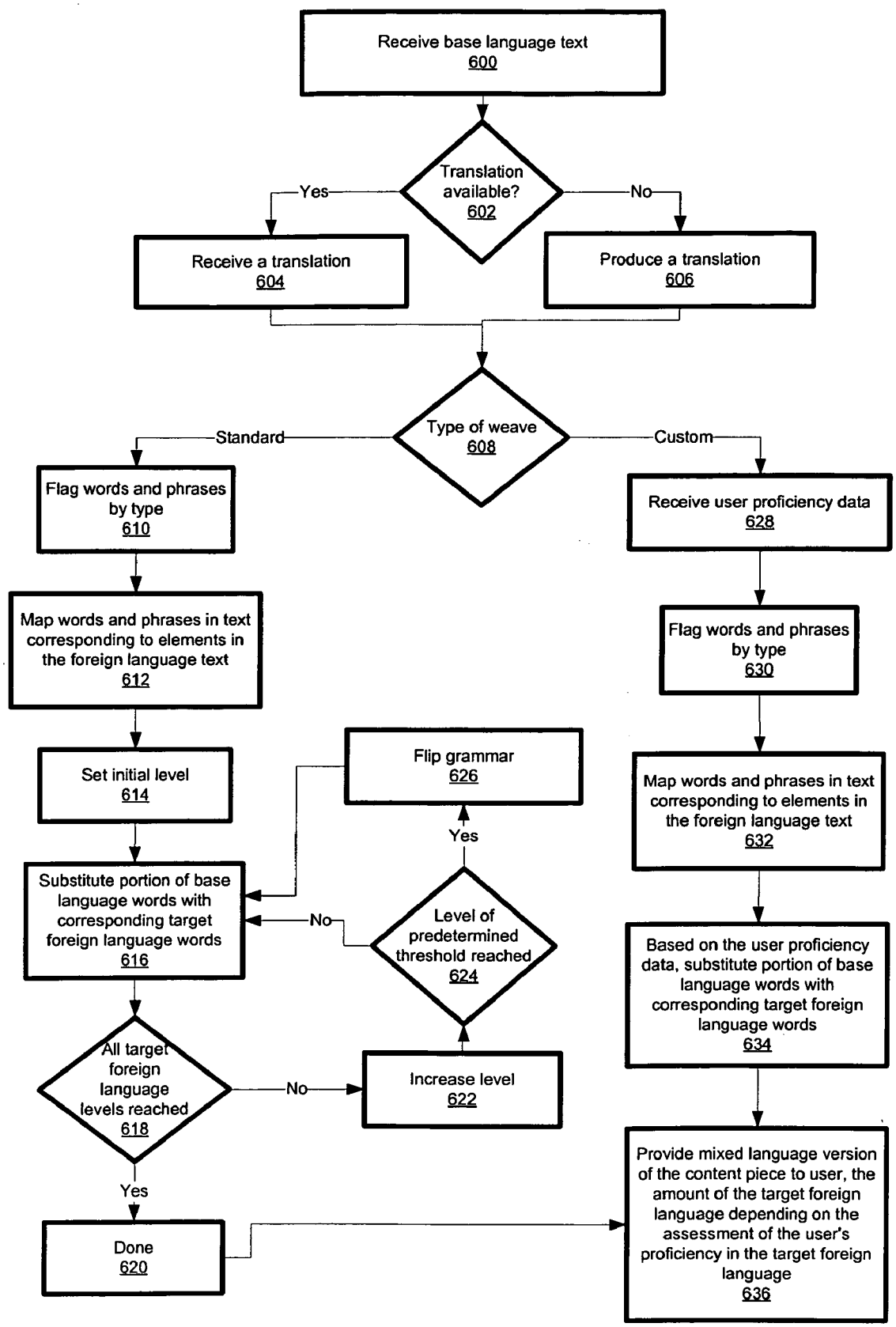
FIG. 6 is a flowchart illustrating an example procedure for creating a text made up of both base language and target foreign language words, according to an example embodiment of the present invention.

FIG. 6 is a flowchart illustrating an example procedure for producing mixed language texts for presentation to a user, according to an example embodiment of the present invention. In 600, the procedure may begin with the receipt of a text in the user's base language, e.g., by an example FLLT. It will be appreciated that the example procedure may be performed by an FLLT, or may be performed by other systems, such as a pre-processing system in communication with the FLLT, or may alternatively be performed by a human editor. The base language may be, for example, any language with which the user is fluent, such as English. In 602, the FLLT may determine whether a translation of the text in the target foreign language is available. If the translation is available, in 604, the FLLT may receive the translation in the target foreign language. If the translation is not available, in 606, the FLLT may produce a translation of the text into the target foreign language. In 608, the FLLT may determine whether the type of the weave to be produced is a standard weave or customized weave.

If the type of weave to be produced is standard, a set of weaves may be produced, for example, at low, low-medium, medium, and high levels of proficiency. In 610, in order to produce the weaves, words and phrases in the text may be flagged according to their types, such as verbs, nouns, etc. In 612, words and phrases in the base language text corresponding to elements in the target foreign language text may be mapped. In 614, an initial level may be set at which to produce the weaves, such as low. In 616, a portion of the base language words may be substituted with corresponding target foreign language words. In 618, it may be determined whether all the desired target foreign language levels have been produced. For example, it may be determined that the levels to be produced are low, medium, and high. Then, if only low has been produced, not all of the target foreign language levels have been produced. Alternatively, if low, medium and high have been produced, then all the target foreign language levels have been produced. In 620, if all the target foreign language levels have been produced, then the method is complete. In 622, if not all the target foreign language levels have been produced, then the level is increased. For example, if the previous level was set at medium, the level may be increased to high. In 624, it may be determined whether the level of predetermined threshold has been reached. For example, this level may be set at medium. In 616, if the level of predetermined threshold has not been reached, another standard weave is produced by substituting a portion of the base language with corresponding target foreign language words. In 626, if the level of predetermined threshold has been reached, then the grammar is flipped. For example, if the base language is English and the grammar was previously in English syntax, the grammar syntax may be flipped to that of the target foreign language, such as Spanish. In 616, another standard weave is produced by substituting a portion of the base language with corresponding target foreign language words.

If the type of weave to produce is custom, then the weave will be designed according to the strengths and weaknesses of a specific user. In 628, a user's proficiency data may be received. For example, a user's proficiency level of specific words in the target foreign language as illustrated in FIG. 3 may be received. In 630, words and phrases in the text may be flagged according to their types, such as verbs, nouns, etc. In 632, words and phrases in the base language text corresponding to elements in the target foreign language text may be mapped. In 634, based on the user's individual proficiency data, base language words may be substituted with corresponding target foreign language words to create a customized weave, as illustrated in FIG. 5. In 636, a mixed language version of the content piece is provided to the user, the amount of target foreign language in the mixed language version of the content piece depending on the assessment of the user's proficiency in the target foreign language.

Figure 7:
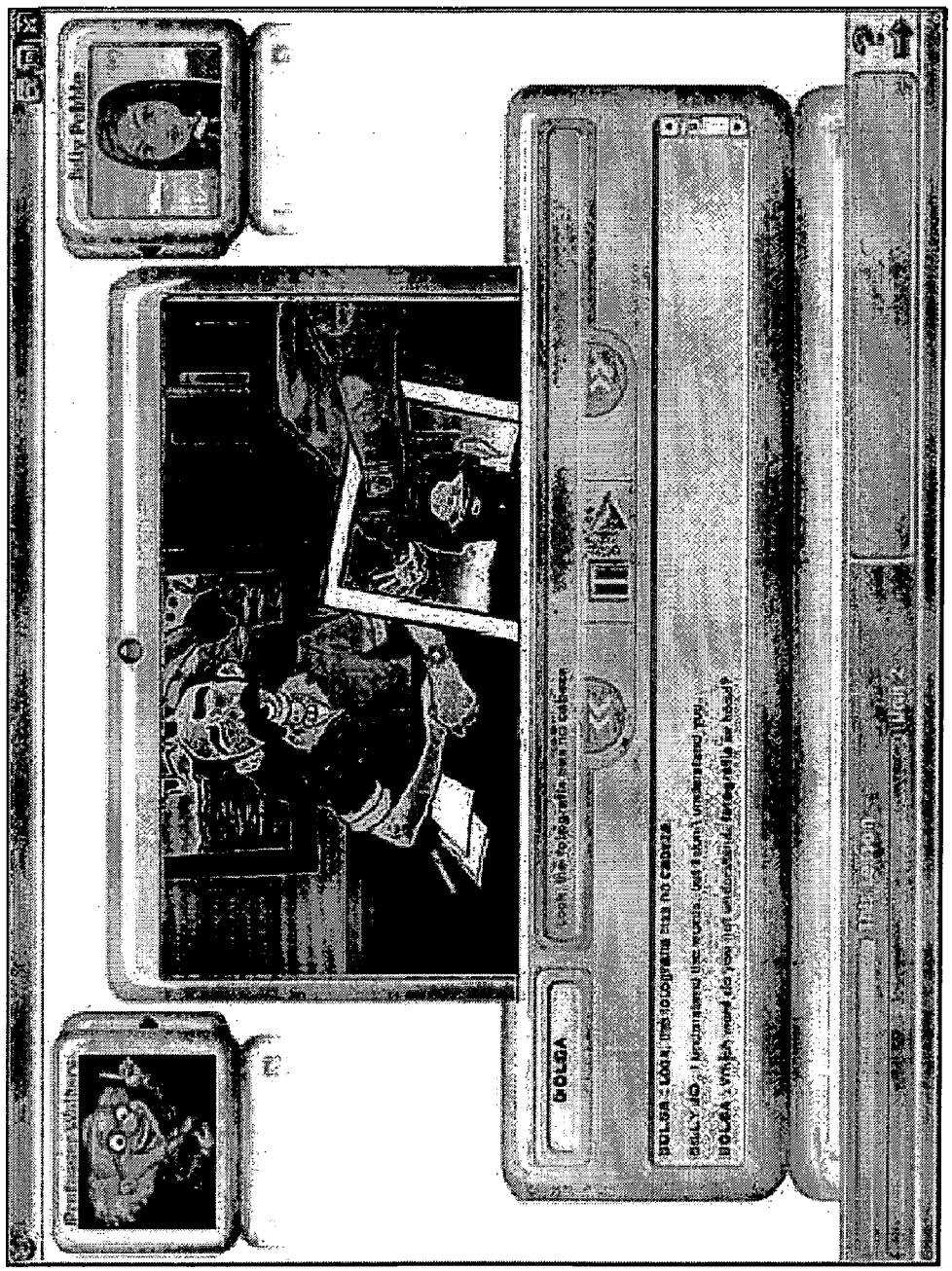
FIG. 7 illustrates the operation of an example application according to an example embodiment of the present invention.

FIG. 7 illustrates the operation of an example application according to an example embodiment of the present invention. In this example, a dialogue is presented to the user in a weave based on his level of proficiency. The text may be read aloud to user while he is presented with it as written text on the screen. Terms in the target foreign language may be highlighted. A video or pictorial image may accompany the written text. Forward and backward controls may be used to control the play of the story.

Figure 8:
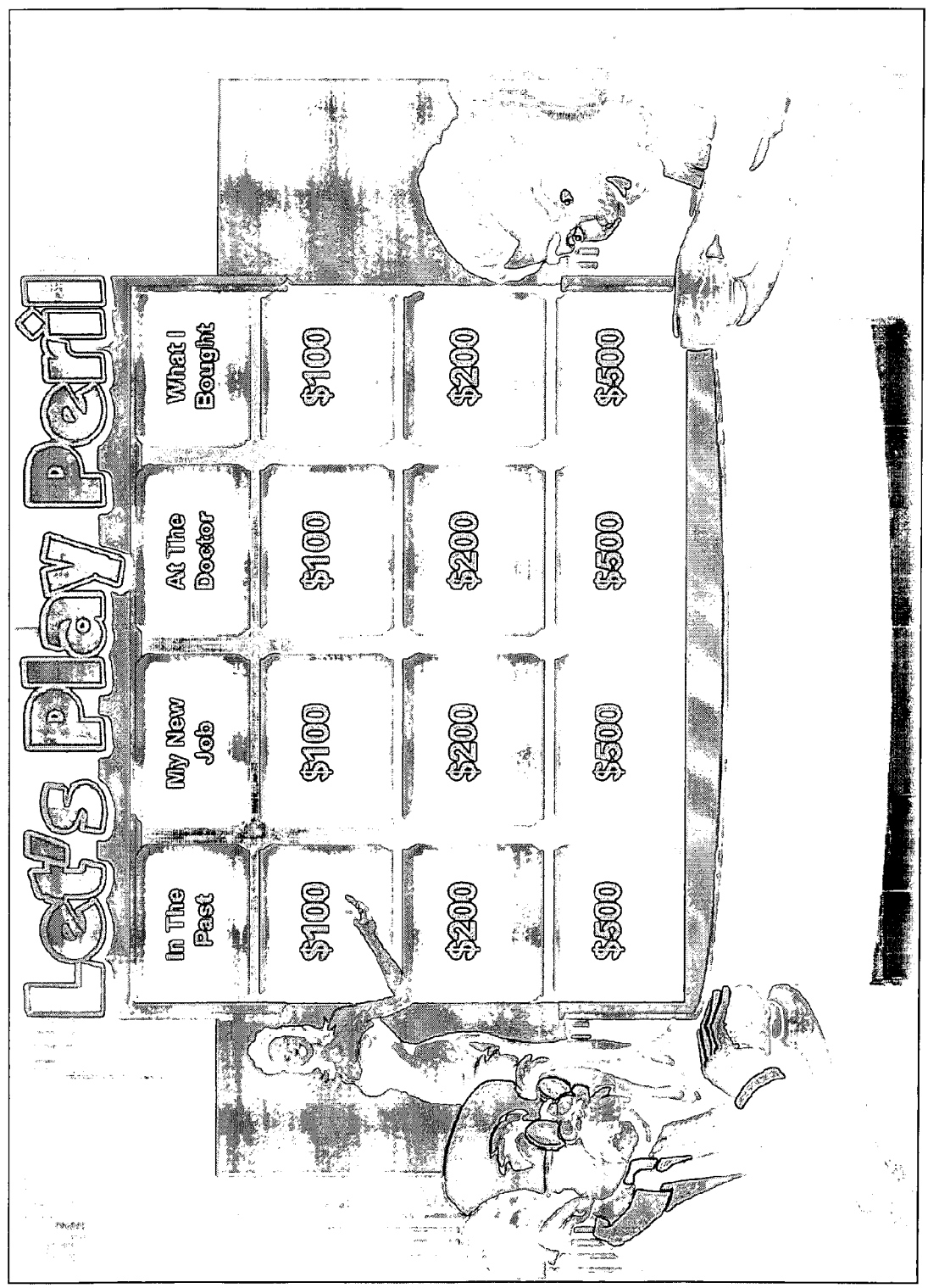
FIGS. 8-12 illustrate the operation of another example application according to an example embodiment of the present invention.
Figure 9:
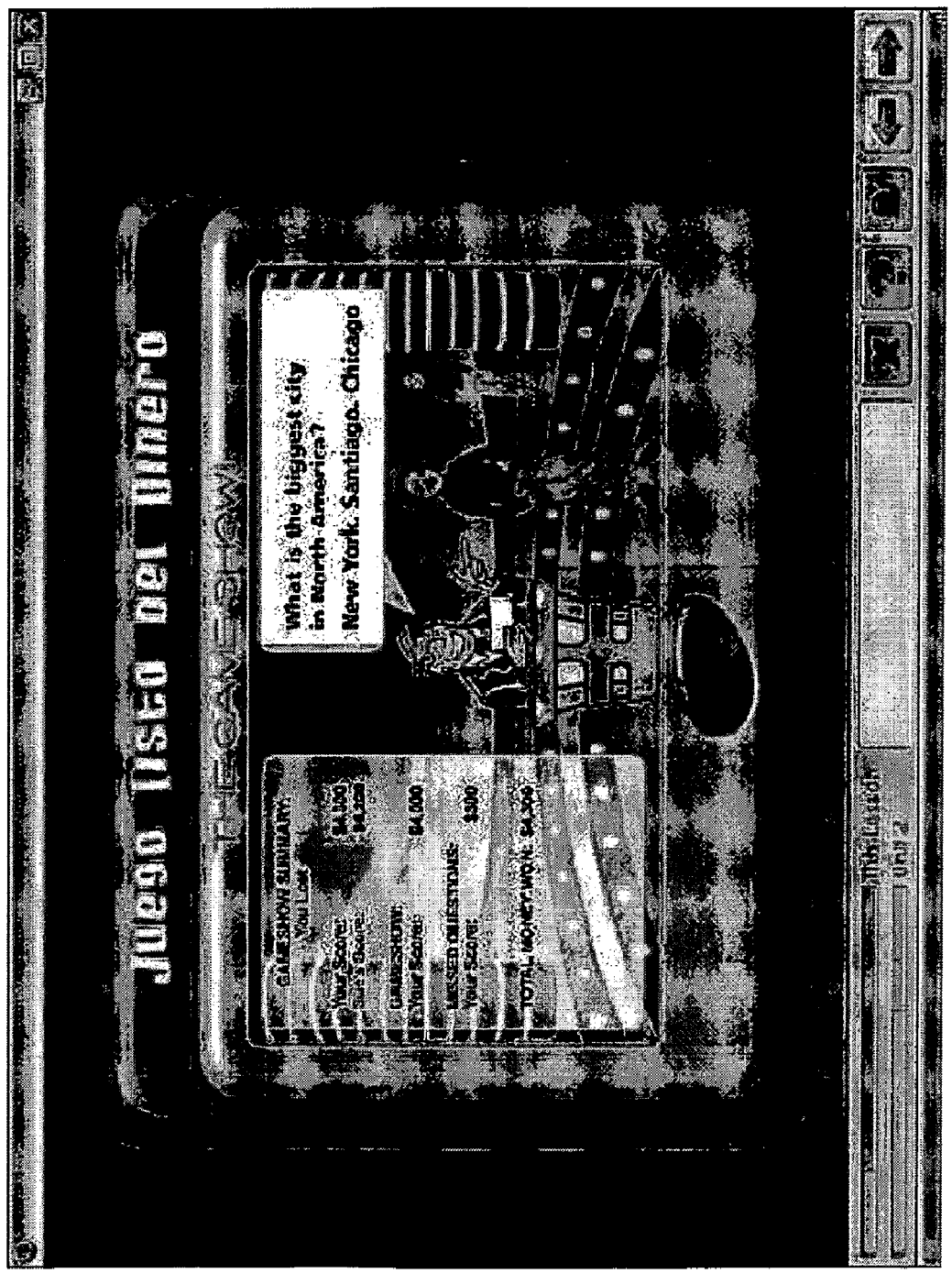
Figure 10:
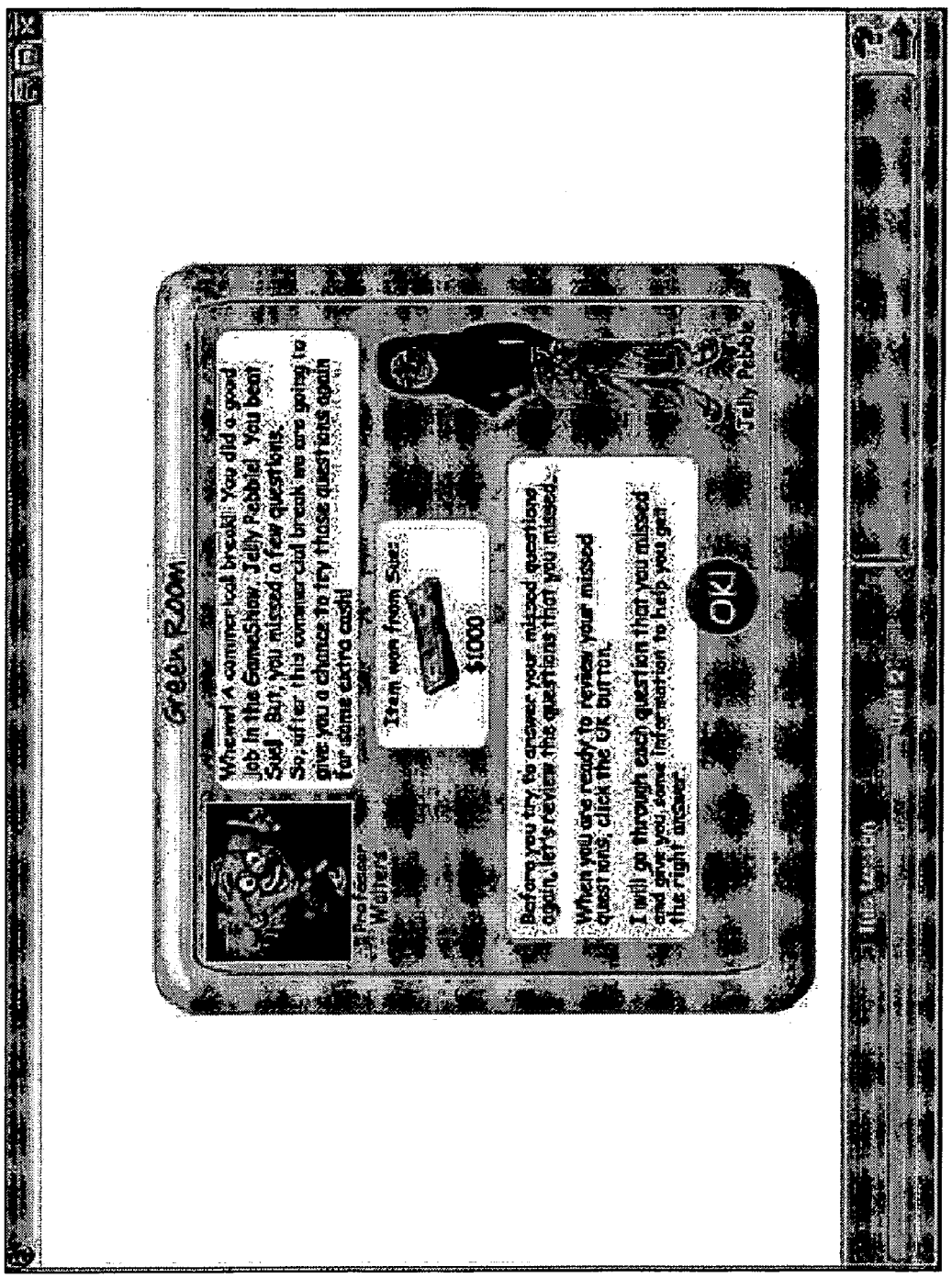
Figure 11:
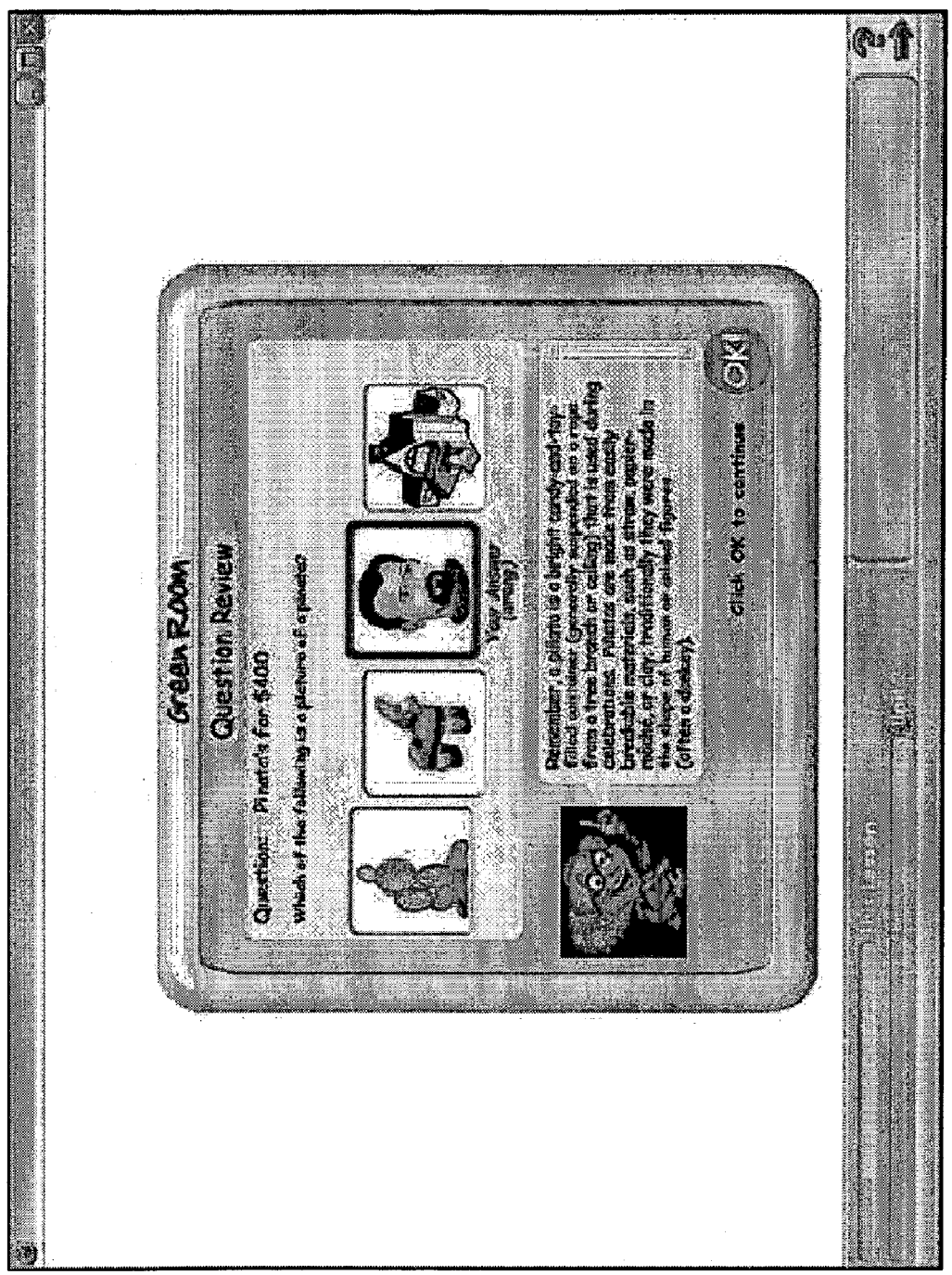
Figure 12:
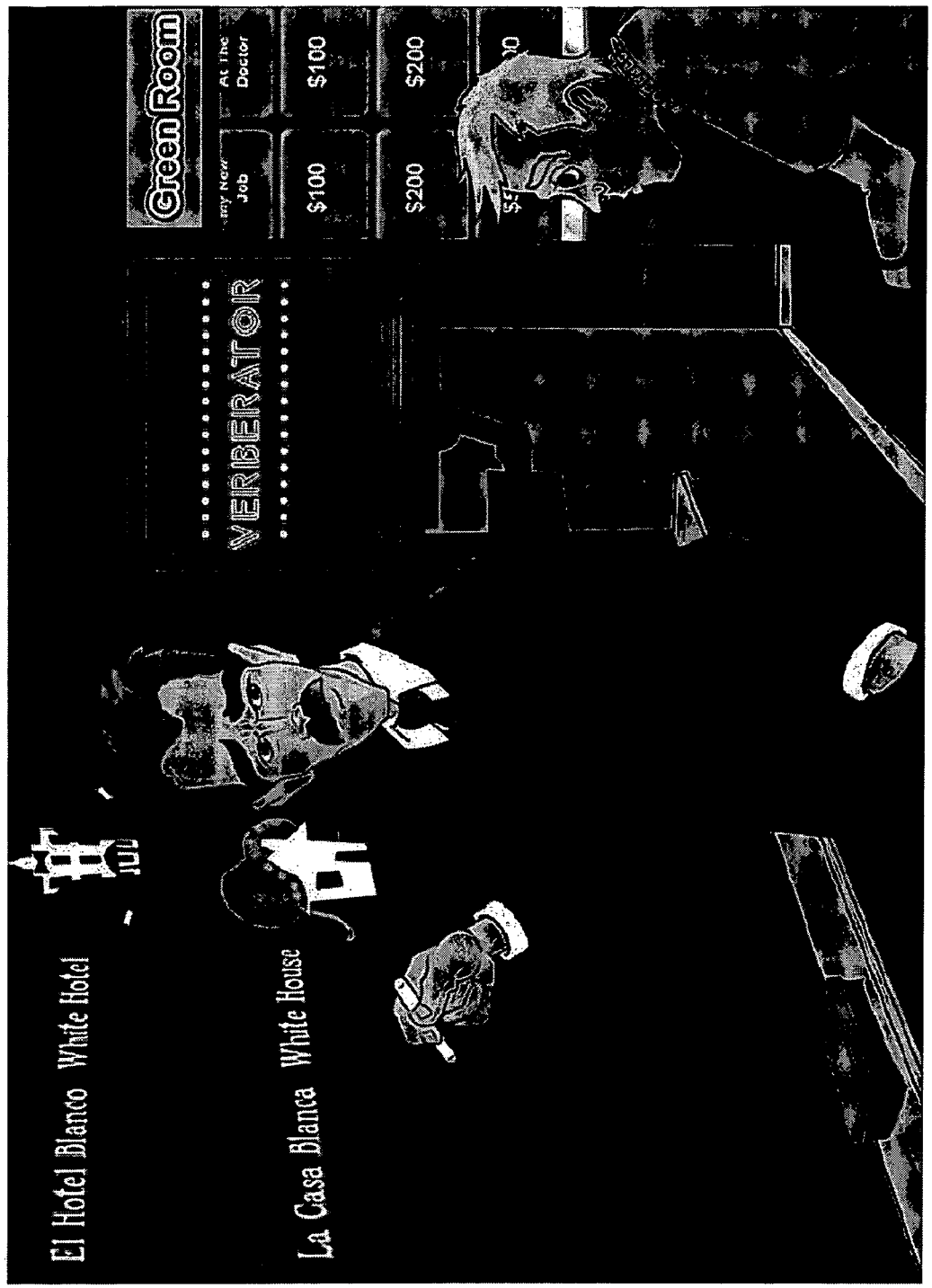

FIGS. 8-12 illustrate the operation of another example application according to an example embodiment of the present invention. The example shown in this figure may be used both as an assessment tool and to reinforce material taught in the story portion. FIG. 8 illustrates the opening screen of a game that incorporates an example embodiment of the present invention. FIG. 9 illustrates a screen shot of a game that may be used as an assessment and reinforcement mechanism, according to an example embodiment of the present invention. FIG. 10 illustrates a screen shot at the end of a game, according to an example embodiment of the present invention. The screen in FIG. 10 appears at the end of the game played, and directs the user to a tutorial to review his mistakes before playing the game again. FIGS. 11-12 illustrate screen shots that appear after a game has been played. The user is led through a tutorial to help him with specific mistakes that he made during operation of the game. A user's performance in the quiz may be monitored and used to update an estimate of the user's proficiency, including both a general proficiency estimate and a specific proficiency estimate for particular vocabulary or concepts.

Figure 13A:
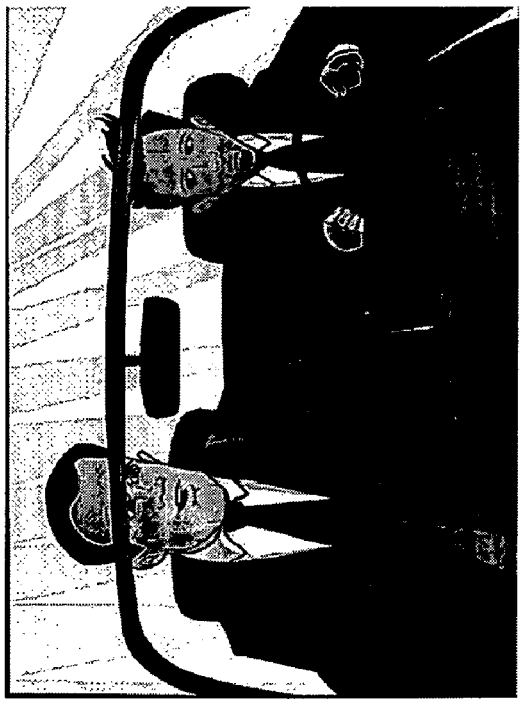
Figure 13E:
Figure 13F:
Figure 16:
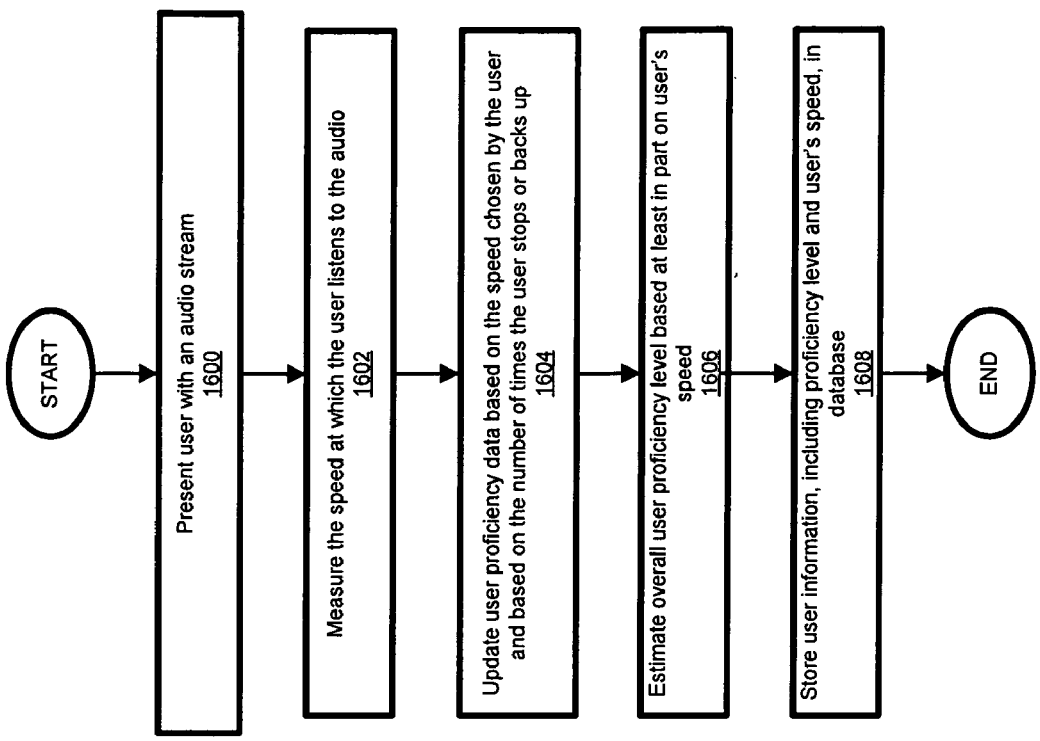
FIGS. 15-24 are flowcharts illustrating example assessment procedures, according to example embodiments of the present invention.
Figure 15:
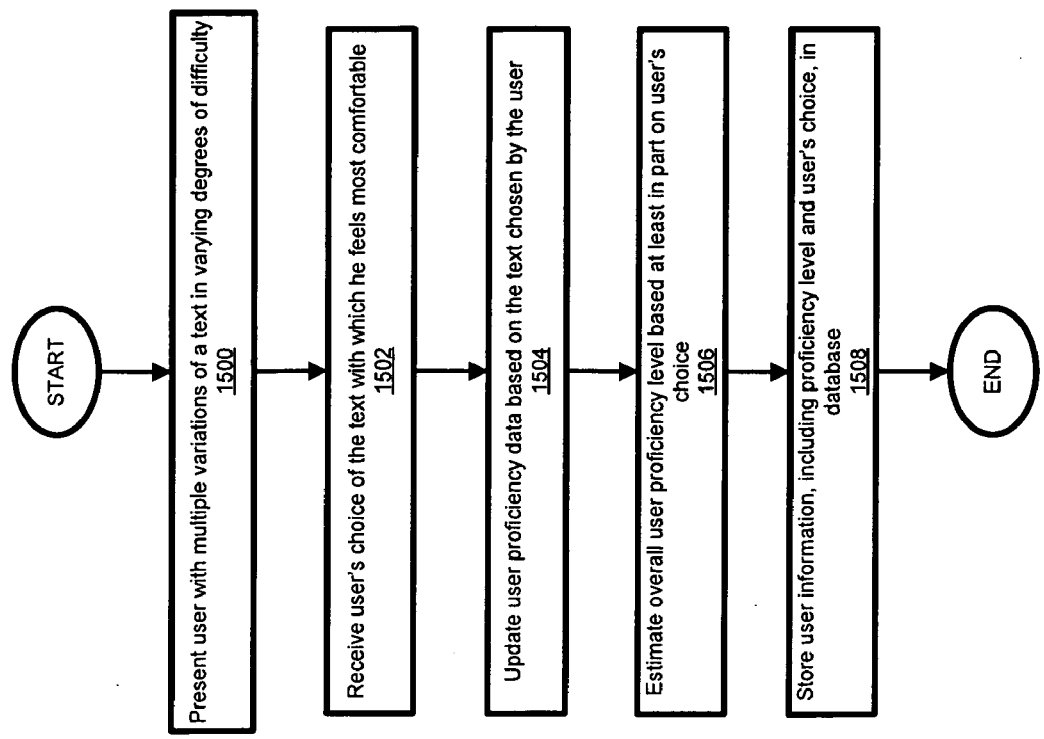
Figure 18:
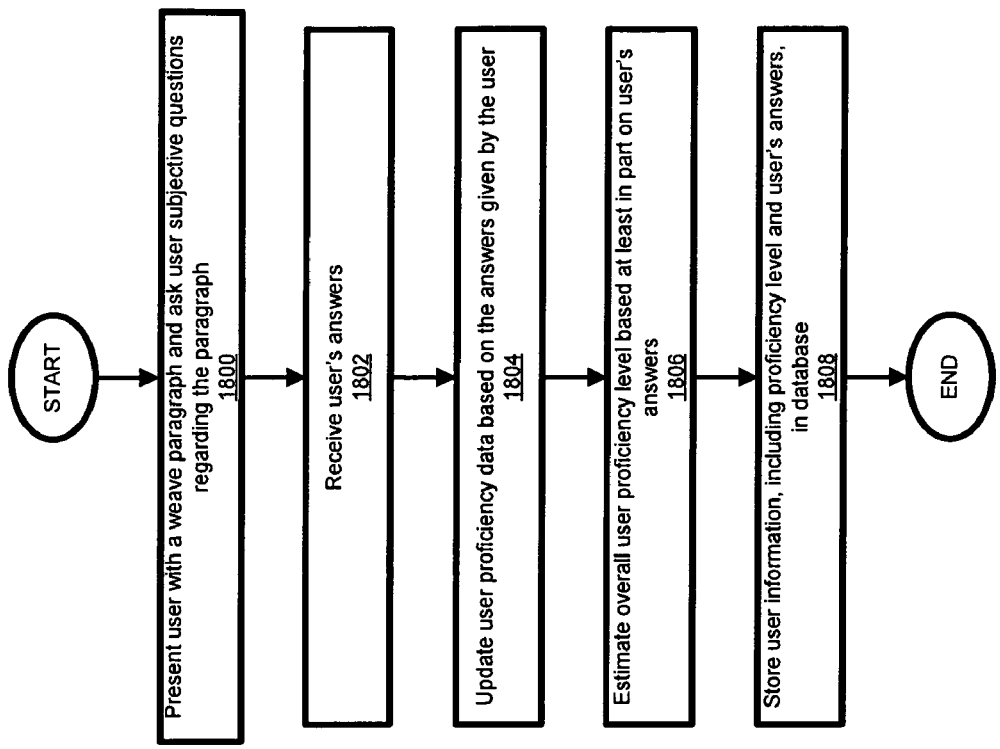
Figure 17:
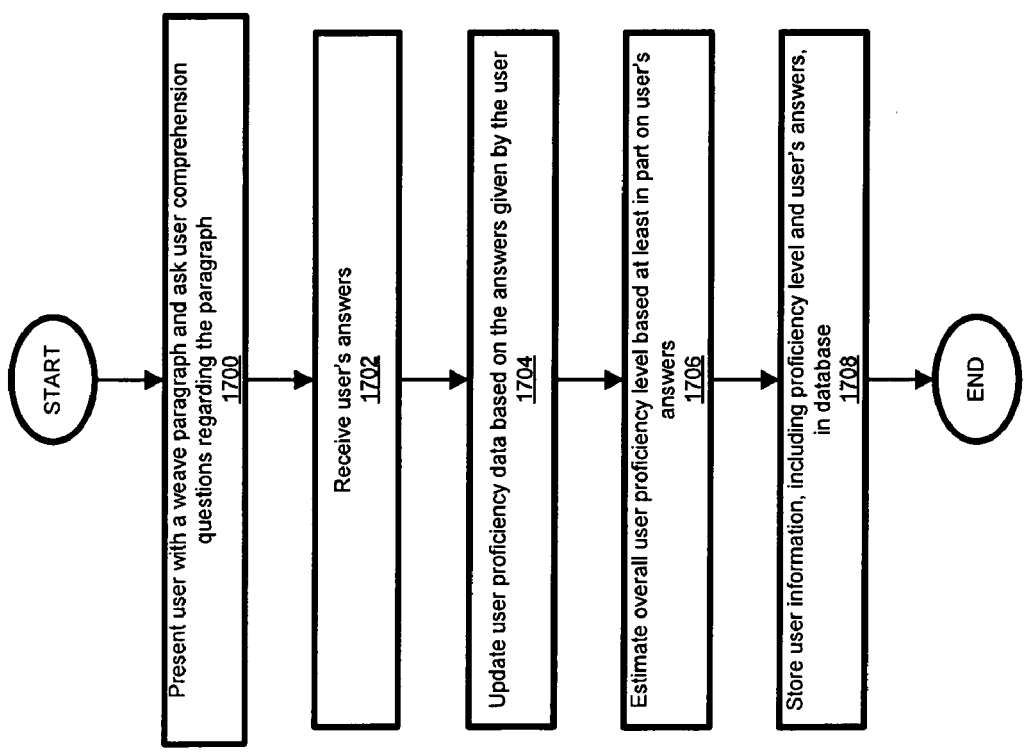
Figure 20:
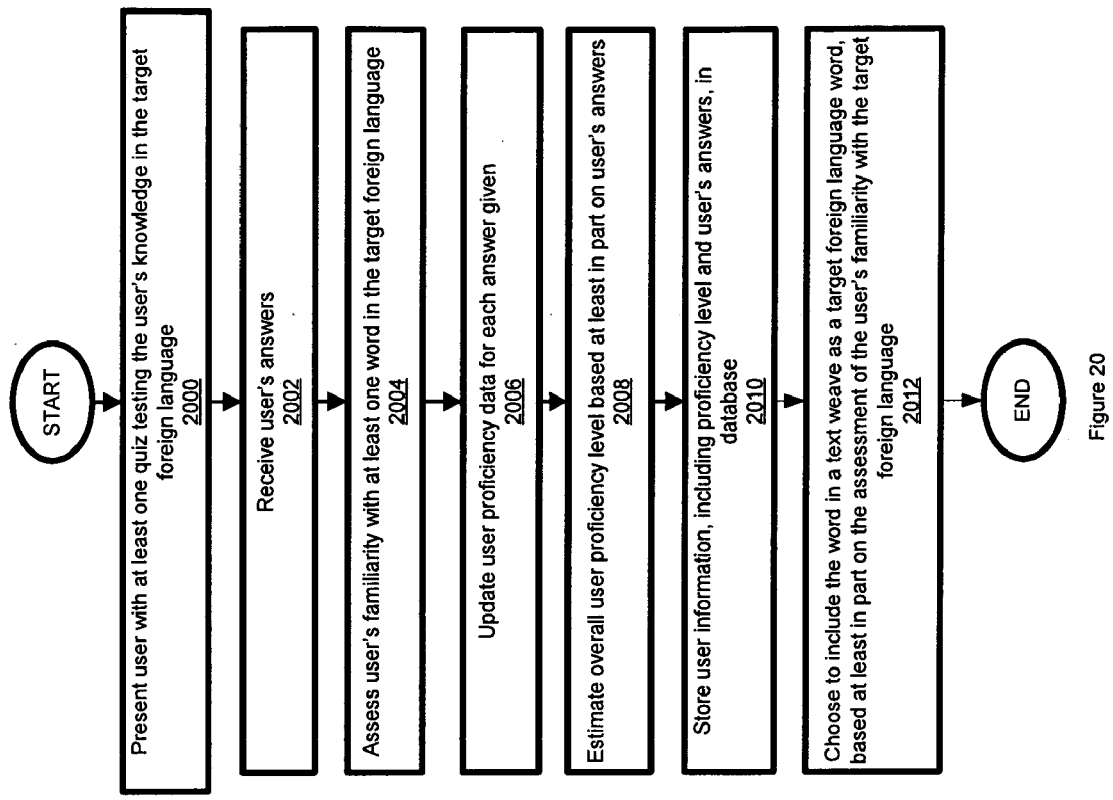
Figure 19:
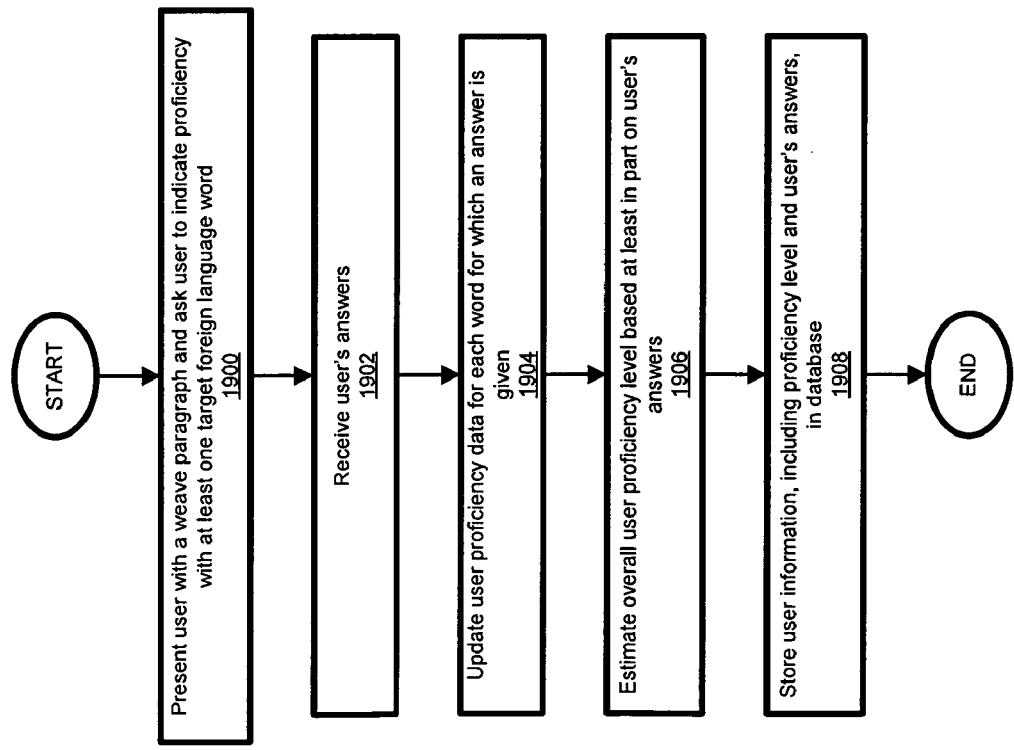
Figure 22:
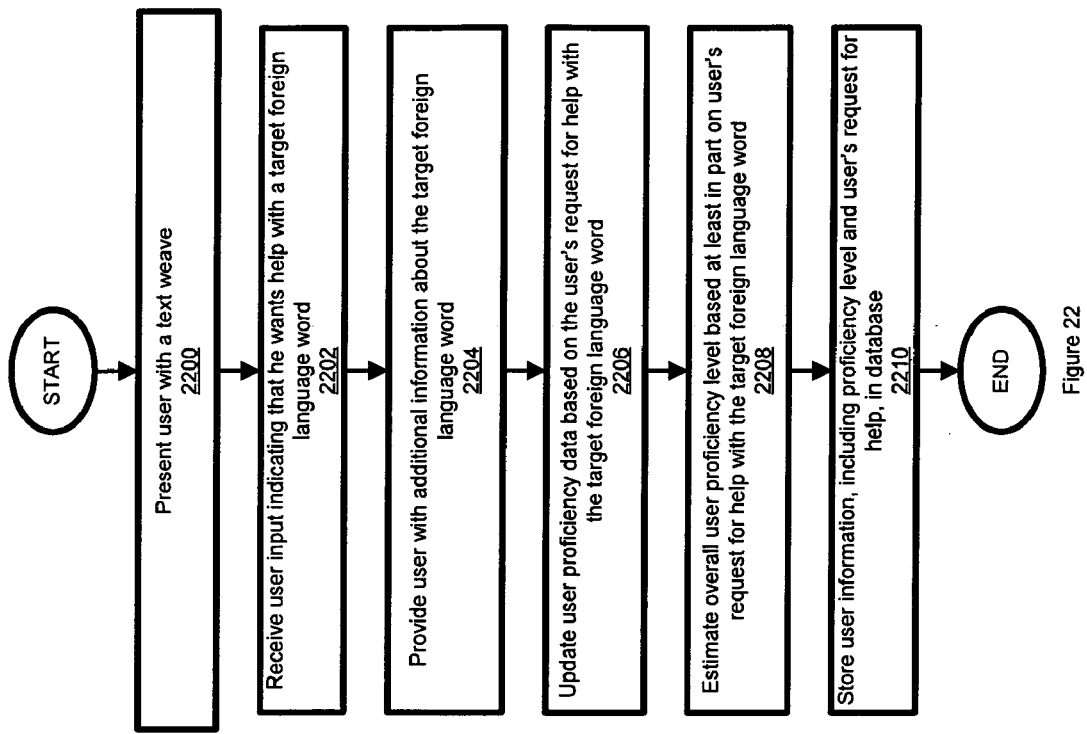
Figure 21:
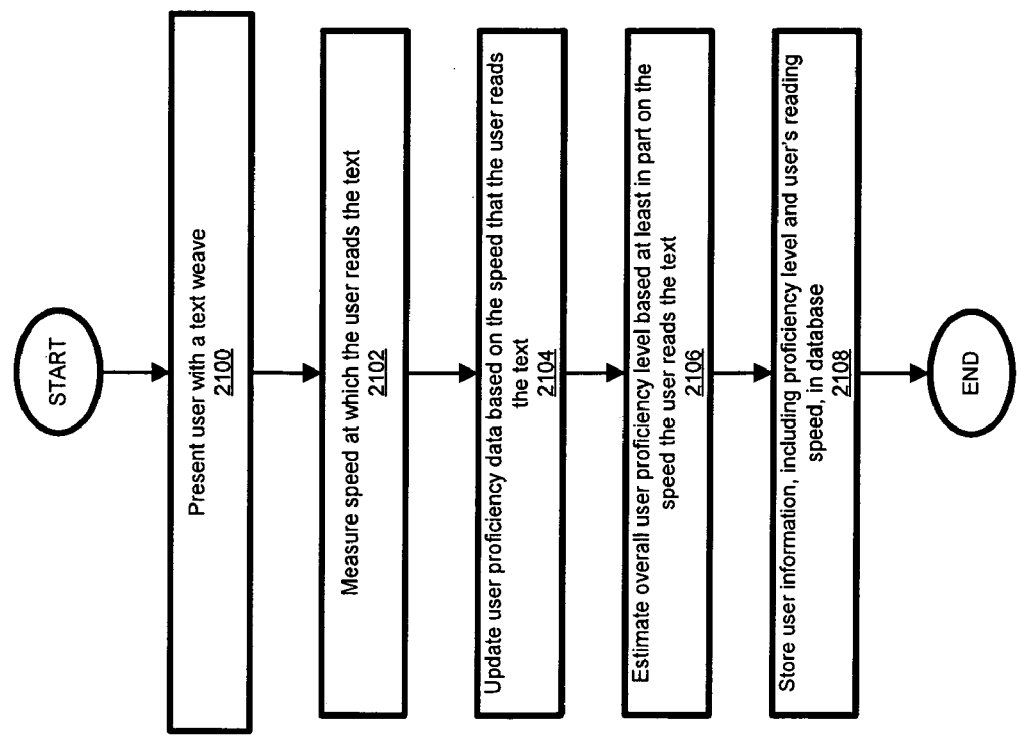
Figure 24:
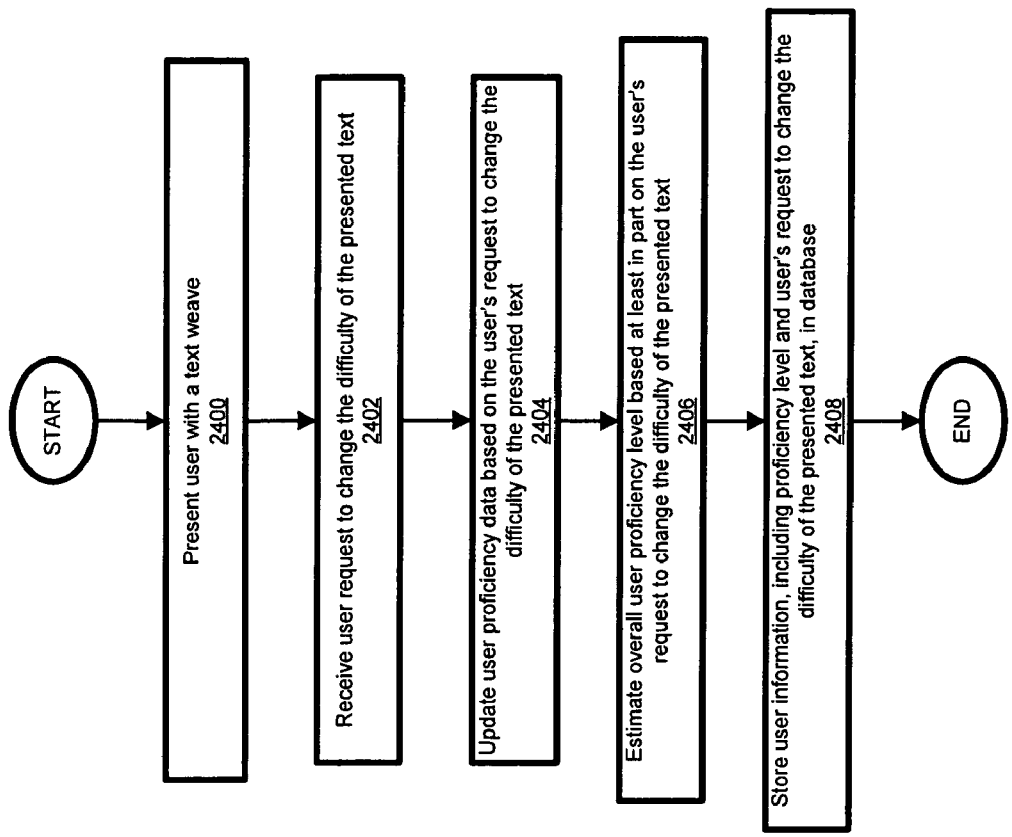
Figure 23:
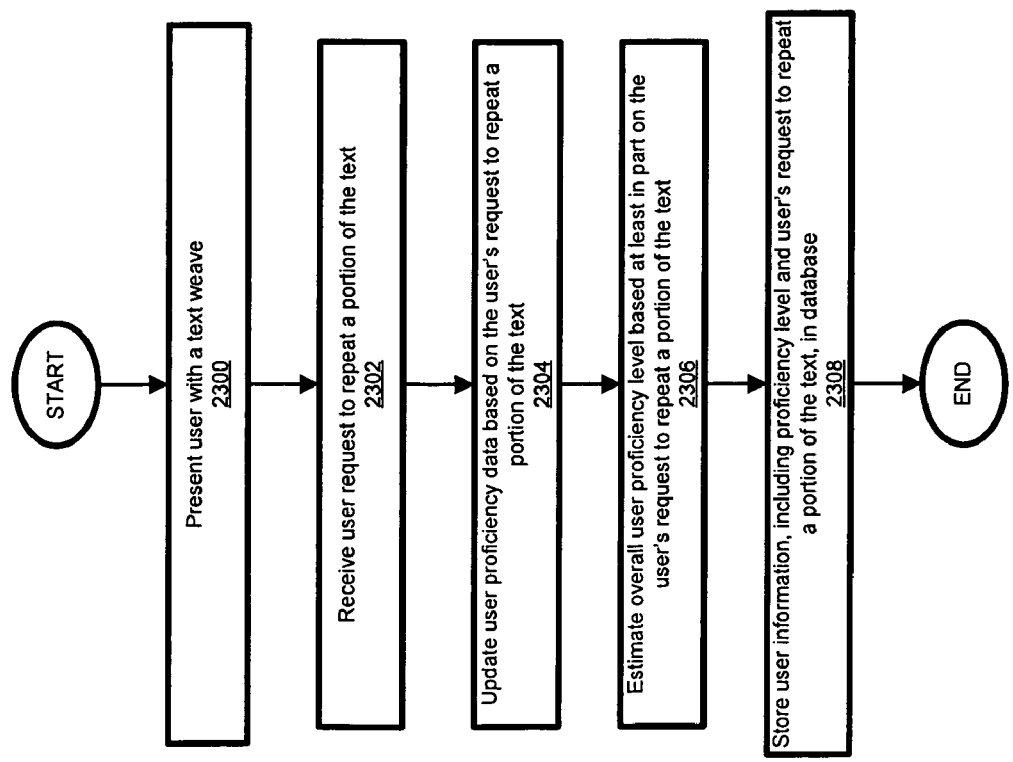

FIGS. 13A-G illustrate the operation of another example application according to an example embodiment of the present invention. The series of screen shots illustrated in FIGS. 13A-G show dialogues in increasing proficiency levels in the target foreign language Spanish. The words presented in the target foreign language, in this example Spanish, appear in boldface text. FIG. 13A illustrates a sample dialogue presented to the user at a low proficiency level. FIG. 13B illustrates a sample dialogue presented to the user at a low-medium proficiency level. FIG. 13C illustrates a sample dialogue presented to the user at a medium-low proficiency level. FIG. 13D illustrates a sample dialogue presented to the user at a medium proficiency level. FIG. 13E illustrates a sample dialogue presented to the user at a medium-high proficiency level. FIG. 13F illustrates a sample dialogue presented to the user at a high-medium proficiency level. FIG. 13G illustrates a sample dialogue presented to the user at a high proficiency level. The user will be presented with the appropriate dialogue, depending on his personal proficiency level as determined by the FLLT. When a predetermined level of proficiency is reached, the base language (e.g., English words with English grammar) with target foreign language (e.g., Spanish) words and phrases substitutions may be replaced by a target foreign language text (e.g., Spanish words with Spanish grammar) with base language (e.g., English) words and phrases substitutions. Thus, at a particular point, English grammar may be replaced by Spanish grammar. Alternatively, different grammatical elements may be changed from the base to the target foreign language at different assessment points, e.g., verb position at one point, noun-adjective relationships at one point, form of interrogatories at one point, etc. Additional aids may be provided to assist the user in acquiring familiarity and understanding with the newly introduced grammatical elements. For example, a "flip" button may be provided that allows an animated display of word order change to be illustrated. Alternatively particular parts of speech may be color-coded so that their corresponding positions in the two word audios are easily identified.

FIGS. 14A-B illustrate the operation of a subscription service, according to an example embodiment of the present invention. FIG. 14A illustrates a news article displayed at a low proficiency level. FIG. 14B illustrates a screen shot a news article displayed at a medium proficiency level.

FIGS. 15-20 are flowcharts illustrating example user assessment techniques, according to example embodiments of the present invention.

In 1500, the user may be presented with multiple of versions of the same text in varying levels of difficulty. The user may be asked which one of the versions he feels is most comfortable for him to read. In 1502, the user may choose the text with which he feels most comfortable. In 1504, the user's proficiency data may be updated based on the text chosen by the user. In 1506, the user's overall proficiency level may be estimated based in part on the user's choice of text. In 1508, user information, including the user's proficiency level and user's choice, may be stored in memory.

In 1600, the user may be presented with an audio stream made up of a text weave. In 1602, the speed at which the user listens to the audio may be measured. In 1604, the user's proficiency data may be updated based on the speed chosen by the user, and frequency with which he stops the audio and/or backs up. In 1606, the user's overall proficiency level may be estimated based in part on the user's choice of speed and the frequency with which he stops the audio and/or backs up. In 1608, user information, including the user's proficiency level and the speed at which the user listened to the audio, may be stored in memory.

In 1700, the user may be presented with a paragraph made up of a text weave, and asked a series of comprehension questions based on the paragraph to test his understanding of the text. In 1702, the user's answers may be received. In 1704, the user's proficiency data may be updated based on his answers. In 1706, the user's overall proficiency level may be estimated based in part on the user's answers. In 1708, user information, including the user's proficiency level and user's answers, may be stored in memory.

In 1800, the user may be presented with a paragraph made up of a text weave, and asked a series of subjective questions based on the paragraph, such as whether he felt the level of difficulty was too high, too low, or acceptable. In 1802, the user's answers may be received. In 1804, the user's proficiency data may be updated based on his answers. In 1806, the user's overall proficiency level may be estimated based in part on the user's answers. In 1808, user information, including the user's proficiency level and user's answers, may be stored in memory.

In 1900, the user may be presented with a paragraph made up of a text weave, and asked to indicate his proficiency level of at least one of the target foreign language words. For example, the user may indicate that he is highly proficient with the Spanish word for "tiger" ("tigre"). In 1902, the user's answers may be received. In 1904, the user's proficiency data may be updated for each word for which an answer is given. In 1906, the user's overall proficiency level may be estimated based in part on the user's answers. In 1908, user information, including the user's proficiency level and user's answers, may be stored in memory.

In 2000, the user may be presented with at least one quiz to test his understanding of the target foreign language. For example, the user may be asked to identify words in a sentence that he recognizes. In 2002, the user's answers may be received. In 2004, the user's familiarity with at least one word in the target foreign language may be assessed. In 2006, the user's proficiency data may be updated for each answer given by the user. In 2008, the user's overall proficiency level may be estimated based in part on the user's answers. In 2010, user information, including the user's proficiency level and user's answers, may be stored in memory. In 2012, a word may be chosen to be included in a text weave as a target foreign language word based at least in part on the assessment of the user's familiarity with the word in the target foreign language.

In 2100, the user may be presented with a text weave. In 2102, the speed at which the user reads the text may be measured. In 2104, the user's proficiency data may be updated based on the user's reading speed. In 2106, the user's overall proficiency level may be estimated based in part on the user's reading speed. In 2108, user information, including the user's proficiency level and the speed at which the user read the text, may be stored in memory.

In 2200, the user may be presented with a text weave. In 2202, user input may be received indicating that the user wants help with a target foreign language word. In 2204, the user may be provided with additional information about the target foreign language word. In 2206, the user's proficiency data may be updated based on the user's request for help with the target foreign language word. In 2208, the user's overall proficiency level may be estimated based in part on the user's request for help with the target foreign language word. In 2210, user information, including the user's proficiency level and the request for help with the target foreign language word, may be stored in memory.

In 2300, the user may be presented with a text weave. In 2302, a user request may be received to repeat a portion of the text. In 2304, the user's proficiency data may be updated based on the user's request to repeat a portion of the text. In 2306, the user's overall proficiency level may be estimated based in part on the user's request to repeat a portion of the text. In 2308, user information, including the user's proficiency level and the request to repeat a portion of the text, may be stored in memory.

In 2400, the user may be presented with a text weave. In 2402, a user request may be received to change the difficulty of the presented text. In 2404, the user's proficiency data may be updated based on the user's request to change the difficulty of the presented text. In 2406, the user's overall proficiency level may be estimated based in part on the user's request to change the difficulty of the presented text. In 2408, user information, including the user's proficiency level and the request to change the difficulty of the presented text, may be stored in memory.

Figure 25:
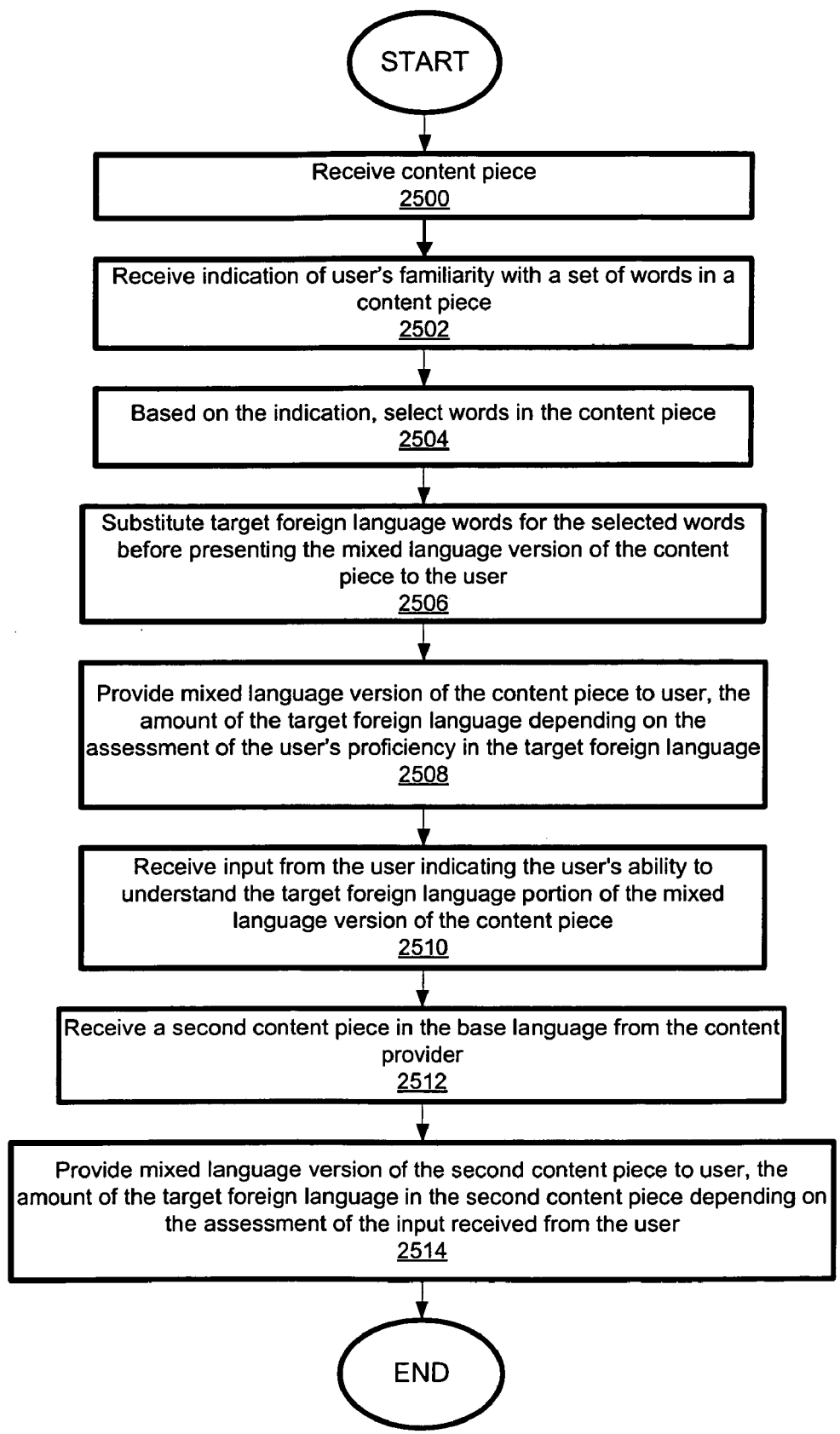
FIG. 25 is a flowchart illustrating another example procedure for creating a customized text for a specific user made up of both base language and target foreign language words, according to an example embodiment of the present invention.

FIG. 25 illustrates an example procedure for creating a customized text for a specific user made up of both base language and target foreign language words, according to an example embodiment of the present invention. In 2500, a content piece is received. This may be, for example, a news story or a magazine article. In 2502, an indication of the user's familiarity with a set of words in the content piece is received. In 2504, words in the content piece are selected based on the indication. In 2506, target foreign language words are substituted for the selected words prior to presenting the mixed language version of the content piece to the user. In 2508, a mixed language version of the content piece to is provided to the user, the amount of the target foreign language depending on the assessment of the user's proficiency in the target foreign language. In 2510, input is received from the user indicating the user's ability to understand the target foreign language portion of the mixed language version of the content piece. In 2512, a second piece in the base language is received from the content provider. In 2514, a mixed language version of the second content piece is provided to the user, the amount of the target foreign language in the second content piece depending on the assessment of the input received from the user.

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A method, implemented in a computing system, comprising:
   receiving a base language text including a plurality of base language words;
   receiving a proficiency datum associated with a user's comprehension of a target foreign language word corresponding to a base language word from the plurality of base language words;
   substituting the target foreign language word for a portion of the instances of the corresponding base language word occurring in the base language text to produce a mixed language text, the portion determined based on the proficiency datum, the substituting performed by a processor;
   and
   presenting the mixed language text to the user.

2. A method, implemented in a computing system, comprising:
   assessing a user's comprehension of a plurality of target foreign language words corresponding to a plurality of base language words;
   producing, in response to the assessing, a mixed language text based on a base language text, the mixed language text including a foreign language word from the plurality of the target foreign language words substituted for a portion of the instances of a corresponding base language word from the plurality of base language words occurring in the base language text, the producing performed in processor; and
   presenting the mixed language text to the user.

3. The method of claim 2, wherein the presenting includes displaying the mixed language text on a video display screen.

4. The method of claim 2, wherein the presenting includes outputting the mixed language text in an audio form.

5. The method of claim 2, wherein the presenting includes simultaneously displaying the mixed language text on a video display screen and outputting the mixed language text in an audio form.

6. The method of claim 2, further comprising:
   receiving the base language text including the plurality of base language words; and
   receiving a foreign language text corresponding to the base language text, the foreign language text including the plurality of target foreign language words,
   the producing including substituting the foreign language word from the plurality of foreign language words for the portion of the instances of the corresponding base language word from the plurality of base language words occurring in the base language text.

7. The method of claim 2, wherein the assessing includes:
   presenting to the user a plurality of questions about the content of a passage of text including at least the foreign language word from the plurality of the target foreign language words;
   receiving from the user a response to the plurality questions; and determining a proficiency datum associated with the user's comprehension of the target foreign language word based on the received response.

8. The method of claim 2, wherein:
the foreign language word from the plurality of the target foreign language words is a first foreign language word;
the assessing includes determining a proficiency datum associated with the user's comprehension of each the target foreign language word from the plurality of foreign language words; and
the producing includes substituting the first foreign language word from the plurality of foreign language words for a first portion of the instances of its corresponding base language word from the plurality of base language words occurring in the base language text based on the proficiency datum associated with the user's comprehension of the first foreign language word and substituting the second foreign language word from the plurality of foreign language words for a second portion of the instances of its corresponding base language word from the plurality of base language words occurring in the base language text based on the proficiency datum associated with the user's comprehension of the second foreign language word, the second portion different than the first portion.

9. The method of claim 2, wherein the assessing includes:
prompting the user to provide an input indicating a level of familiarity with the foreign language word from the plurality of the target foreign language words; and
estimating the user's proficiency with the foreign language word from the plurality of the target foreign language words, based on the input.

10. The method of claim 2, wherein the assessing includes:
measuring a speed at which the user reads a passage of text; and
updating, based at least in part on the speed measurement, a datum associated with the user's proficiency with the target foreign language.

11. The method of claim 2, wherein the assessing includes:
measuring a speed at which the user listens to an audio version of a passage of text; and
updating, based at least in part on the speed measurement, a datum associated with the user's proficiency with the target foreign language.

12. The method of claim 2, wherein the assessing includes determining a datum associated with the user's comprehension of the plurality of target foreign language words, the method further comprising:
receiving an input indicating that the user wants help with at least one foreign language word from the plurality of target foreign language words;
providing the user with additional information about the at least one foreign language word; and
updating the datum based at least in part on the input.

13. The method of claim 2, wherein the assessing includes determining a datum associated with the user's comprehension of the plurality of target foreign language words, the method further comprising:
receiving a user request to repeat a portion of the mixed language text presented to the user; and
updating the datum based at least in part on the user request.

14. A method, implemented in a computing system, comprising:
receiving a base language content piece from a content provider;

receiving a request for a mixed language version the content piece from a user;
receiving an assessment associated with the user's proficiency with a plurality of foreign language words; and
producing the mixed language version of the content piece by a processor, the mixed language version including a first foreign language word from the plurality of the foreign language words substituted for all of the instances of a corresponding first base language word occurring in the base language content piece when the assessment indicates that the user is proficient with the first foreign language word,
the mixed language version including a second foreign language word from the plurality of the foreign language words substituted for a portion of the instances of a corresponding second base language word occurring in the base language content piece when the assessment indicates that the user is less than proficient with the second foreign language word.

15. The method of claim 14, wherein the base language content piece is provided as part of an Internet subscription service to which the user subscribes.

16. The method of claim 14, wherein the base language content piece is a news article.

17. The method of claim 14, wherein the base language content piece is an audiovisual story.

18. The method of claim 14 wherein the base language content piece is a novel.

19. The method of claim 14, wherein the base language content piece is an audio stream.

20. The method of claim 14, wherein the base language content piece is a first base language content piece, the portion of the instances is a first portion, the method further comprising:
receiving an input from the user the user's comprehension of the mixed language version of the content piece;
receiving a second base language content piece from the content provider; and
producing a mixed language version of the second content piece, the mixed language version of the second content piece including the second foreign language word from the plurality of the foreign language words substituted for a second portion of the instances of the corresponding second base language word occurring in the second base language content piece, the second portion different from the first portion, the second portion based, at least in part, on the input.

21. A system, comprising:
a content database containing a plurality of base language texts;
an assessment module configured to produce an indication of a user's comprehension of each word from a plurality of foreign language words in a target foreign language, each of the plurality of foreign language words corresponding to a base language word; and
a processor configured to substitute a foreign language word from the plurality of foreign language words for a portion of the instances of a corresponding base language word occurring in the base language text to produce a mixed language version of the base language text, the portion based on the indication.

22. The system of claim 21, further comprising:
a user proficiency database containing a record including the indication of the user's comprehension of the foreign language word.

23. The system of claim 22, wherein the records further includes a datum associated with whether the foreign language word has been presented to the user by the system.

24. The system of claim 22, wherein the records further includes a datum associated with the number of times the foreign language word has been presented to the user by the system.

25. The system of claim 22, wherein the record is a record from a plurality of records contained within the user proficiency database, each record from the plurality of records corresponding to a different meaning of the at least one of the foreign language word or the corresponding base language word.

26. The system of claim 22, wherein the record is a record from a plurality of records contained within the user proficiency database, each record from the plurality of records corresponding to an idiom associated with at least one of the foreign language word or the corresponding base language word.

27. The system of claim 22, wherein:
the assessment module is configured to produce an indication of the user's comprehension of each phrase from a plurality of foreign language phrases, each phrase from the plurality of foreign language phrases corresponding to a base language phrase; and
the processor is configured to substitute a foreign language phrase from the plurality of foreign language phrases for an amount of the instances of a corresponding base language phrase occurring in the base language text to produce the mixed language version of the base language text, the amount based on the indication of the user's comprehension of each phrase.

28. The system of claim 21, further comprising:
an audio output device in communication with the processor, the audio output device configured to output an audio output corresponding to the mixed language version of the base language text.

29. The system of claim 21, further comprising:
a video output device in communication with the processor, the video output device configured to output a video corresponding the mixed language version of the base language text.

30. The system of claim 21, wherein the assessment module is configured to present to the user a plurality of questions and answers regarding the content of a passage of text including at least the foreign language word.

31. The system of claim 21, wherein the assessment module is configured to query the user regarding the user's subjective comfort with an amount of target foreign language words in the mixed language version of the base language text presented to the user.

32. The system of claim 21, wherein the assessment module is configured to produce the indication based on the user's response time.

33. The system of claim 21, further comprising:
a help module configured to respond to user requests for assistance in understanding the mixed language version of the base language text.

34. The system of claim 33, wherein the help module includes a dictionary look-up system configured to display the base language word corresponding to the foreign language word in response to a help request from the user.

35. The system of claim 33, wherein the assessment module is configured to produce the indication based on the frequency help requests submitted by the user.

* * * * *

UNITED STATES PATENT AND TRADEMARK OFFICE
CERTIFICATE OF CORRECTION

| | | |
|---|---|---|
| PATENT NO. | : 7,818,164 B2 | Page 1 of 1 |
| APPLICATION NO. | : 11/508032 | |
| DATED | : October 19, 2010 | |
| INVENTOR(S) | : Michael C. Wood et al. | |

It is certified that error appears in the above-identified patent and that said Letters Patent is hereby corrected as shown below:

Column 18, line 39 (Claim 2), after "in" insert --a--.

Column 20, line 1 (Claim 14), after "version" insert --of--.

Column 20, line 58 (Claim 21), delete "the".

Column 21, line 5 (Claim 23), replace "records" with --record--;
        line 8 (Claim 24), replace "records" with --record--; and
        line 9 (Claim 24), replace "the" (first occurrence) with --a--;
        line 15 (Claim 25), delete "the" (first occurrence).

Column 22, lines 32 and 33 (Claim 35), replace "on the frequency help" with --on a frequency of help--.

Signed and Sealed this
Twenty-fifth Day of January, 2011

David J. Kappos
*Director of the United States Patent and Trademark Office*